US010495522B2

(12) United States Patent
Sumer et al.

(10) Patent No.: US 10,495,522 B2
(45) Date of Patent: Dec. 3, 2019

(54) SYSTEM AND METHOD FOR ENGINE OIL TEMPERATURE ESTIMATION

(71) Applicant: Ford Global Technologies, LLC, Dearborn, MI (US)

(72) Inventors: Erol Dogan Sumer, Ann Arbor, MI (US); Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 15/720,656

(22) Filed: Sep. 29, 2017

(65) Prior Publication Data

US 2019/0101458 A1    Apr. 4, 2019

(51) Int. Cl.
| | | |
|---|---|---|
| *F01L 1/34* | (2006.01) |
| *G01K 7/42* | (2006.01) |
| *F02D 13/02* | (2006.01) |
| *F01L 1/344* | (2006.01) |
| *F01M 11/00* | (2006.01) |
| *F01M 11/10* | (2006.01) |

(Continued)

(52) U.S. Cl.
CPC ............ *G01K 7/427* (2013.01); *F01L 1/3442* (2013.01); *F01L 1/34409* (2013.01); *F02D 13/0219* (2013.01); *F01L 2001/0535* (2013.01); *F01L 2001/3443* (2013.01); *F01L 2001/34456* (2013.01); *F01L 2250/02* (2013.01); *F01L 2250/04* (2013.01); *F01L 2800/05* (2013.01); *F01L 2800/11* (2013.01); *F01L 2820/01* (2013.01); *F01M 2011/0045* (2013.01); *F01M 2011/1473* (2013.01); *F02D 13/0207* (2013.01); *F02D 2041/001* (2013.01); *F02D 2200/023* (2013.01)

(58) Field of Classification Search
CPC ................ G01K 7/427; F02D 13/0207; F02D 2200/023; F02D 13/0217; F02D 2041/001; F01L 1/34409; F01L 1/3442; F01L 2001/0535; F01L 2001/3443; F01L 2001/34456; F01L 2250/02; F01L 2250/04; F01L 2800/05; F01L 2800/11; F01L 2820/01; F01M 2011/0045; F01M 2011/1473
See application file for complete search history.

(56) References Cited

U.S. PATENT DOCUMENTS

| | | | |
|---|---|---|---|
| 5,289,805 A | 3/1994 | Quinn, Jr. et al. | |
| 9,598,985 B2 | 3/2017 | Pietrzyk et al. | |
| 2016/0341079 A1* | 11/2016 | Takahata | ............... F01L 1/3442 |

OTHER PUBLICATIONS

Sumer, Erol et al., "Method and System for Variable Camshaft Timing Control," U.S. Appl. No. 15/453,797, filed Mar. 8, 2017, 37 pages.

* cited by examiner

*Primary Examiner* — Zelalem Eshete

(74) *Attorney, Agent, or Firm* — Geoffrey Brumbaugh; McCoy Russell LLP

(57) ABSTRACT

Methods and systems are provided for estimating engine oil temperature during conditions when sensors used for engine oil temperature measurement are not functional or not reliable. A null duty cycle of a solenoid spool valve of a variable cam timing mechanism is estimated. Then, a calibrated relationship between the duty cycle, an angular velocity of the associated cam, and the engine oil temperature is used to estimate an engine oil temperature when existing sensors used in the calculation of engine oil temperature calculation become unreliable.

19 Claims, 10 Drawing Sheets

(51) Int. Cl.
*F02D 41/00* (2006.01)
*F01L 1/053* (2006.01)

FIG. 6

Table 600:

| rate (deg/s) \ eot (F) | -50 | -25 | 0 | 25 | 50 |
|---|---|---|---|---|---|
| 120 | 0.55 | 0.45 | 0.40 | 0.36 | 0.28 |
| 150 | 0.6 | 0.5 | 0.45 | 0.41 | 0.37 |
| 180 | 0.62 | 0.53 | 0.49 | 0.44 | 0.39 |

Table 620:

| $DC_{null}$ | 0.40 | 0.45 | 0.49 |
|---|---|---|---|
| EOT | 120 | 150 | 180 |

Table 630:

| $DC_{null}$ | 0.4067 | 0.4232 | 0.439 | 0.4535 | 0.4628 | 0.4658 | 0.4678 | 0.4687 |
|---|---|---|---|---|---|---|---|---|
| EOT | 100 | 120 | 140 | 160 | 175 | 185 | 190 | 195 |

SYSTEM AND METHOD FOR ENGINE OIL TEMPERATURE ESTIMATION

FIELD

The present description relates generally to methods and systems for estimating an engine oil temperature in an engine system configured with an oil-pressure actuated VCT mechanism.

BACKGROUND/SUMMARY

Engine control system use multiple variables for adjusting various engine operations. For example, an engine oil temperature (EOT) estimate may be used for calculating total friction and pumping losses at an engine, which in turn is used for torque control. As another example, EOT is used for powertrain limiting wherein an engine idle speed as well as a maximum and minimum permissible engine speed is limited to protect the engine from extreme temperature conditions (such as may occur when the EOT is too high or too low). EOT values may also be used for adjusting variable camshaft timing, controlling positive crankcase ventilation, and engine oil life monitoring.

Various approaches have been developed for EOT estimation. Some approaches rely on a direct EOT estimation via a temperature sensor coupled to an engine oil sump. Still other approaches rely on an (indirect) EOT inference logic wherein signals from various engine sensors, such as an engine coolant temperature (ECT) sensor, mature mass air flow (MAF) sensor, air charge temperature (ACT) sensor, etc., are combined with a last inferred EOT value stored in an engine controller's memory (e.g., in a keep alive memory or KAM) to generate inferred values during engine operation.

However, the inventors herein have identified potential issues with such approaches. As one example, in the direct estimation approach, degradation of the temperature sensor may cause the EOT measurements to become inaccurate. As another example, in the indirect estimation approach, degradation of any of the KAM, ECT sensor, MAF sensor, and ACT sensor (or any other such sensors being used in the EOT inference logic) can cause the inferred EOT value to be unreliable. Even when the sensors are functional, there may be conditions when the input from one or more sensors is not reliable for EOT estimation. As an example, during warm engine starts, the engine coolant may be significantly warmer than the engine oil. The engine controller may utilize a soak time (that is, the total amount of time passed since the moment the engine was turned off), the engine coolant temperature estimated by the ECT sensor, and a last estimated EOT value before the engine was turned off to calculate an initial EOT estimate for the EOT inference logic during the subsequent engine start. However, if either the soak time or the last estimated EOT value is corrupt due to a KAM error, then the initial EOT estimate may be inaccurate for at least the first several minutes of vehicle operation. As such, inaccuracies in EOT estimation can lead to sub-optimal engine performance. In addition, over-heating of the engine oil can lead to engine component degradation, and reduction of engine life.

The inventors herein have recognized that a temperature dependency of an oil control valve (OCV) of a variable camshaft timing (VCT) mechanism can be advantageously leveraged for reliable EOT estimation. For example, the relationship can be used to infer EOT when a sensor used in EOT estimation is degraded and/or when engine conditions render the sensor output less reliable. In one example, engine oil temperature may be estimated by a method for an engine comprising: adjusting an engine torque actuator responsive to engine oil temperature, the engine oil temperature formed from a mapped relationship stored in memory of camshaft solenoid duty cycle and camshaft angular velocity of a variable camshaft timing device.

As one example, an engine may be configured with an oil-pressure actuated VCT device that is actuated by a solenoid oil control valve (OCV). The VCT device may include an intake cam and an exhaust cam. Responsive to EOT estimation conditions being met, and one or more EOT faults being set, EOT estimation via a mapped relationship between camshaft solenoid duty cycle and camshaft angular velocity may be applied. The one or more EOT faults may include degradation of a sensor used to measure EOT (such as EOT sensor, an ECT sensor, an ACT sensor, etc.). The one or more EOT faults may alternatively include conditions where sensor output is not reliable, such as when the KAM is corrupted or during an engine warm-start. During such conditions, the controller may apply an excitation pulse to one of the intake and exhaust cam. For example, the controller may pass a current of a defined duty cycle pulse width through a solenoid of the OCV controlling the cams. The duty cycle may be selected so that the spool valve is moved to a position that directs engine oil to cam wheel pressure chambers, thereby rotating the cam wheel (in an advance or retard direction, as required based on the selected timing) relative to the camshaft. The controller may measure a change in camshaft speed or velocity (via a camshaft position sensor, for example) corresponding to the applied duty cycle and estimate a null duty cycle of the OCV in accordance. Based on the estimated null duty cycle, and further based on a mapped and calibrated relationship between angular velocity of the camshaft and solenoid duty cycle (e.g., mapped via an inverse model), the controller may infer an EOT. The estimated EOT may then be used to reliably estimate engine torque and actuate one or more torque actuators.

In this way, a reliable EOT estimate may be provided during conditions when sensors regularly used for measuring or estimating EOT are degraded, or when the output of such sensors is not reliable. The technical effect of relying on a mapped relationship between an applied duty cycle to an oil control valve (OCV) of an oil-pressure actuated VCT and angular velocity of the cam that the OCV actuates is that a more robust method of EOT estimation can be provided. By leveraging the temperature dependency of a resistance of the OCV in estimating EOT, the need for dedicated sensors is reduced, providing component reduction, and improving robustness of the approach to various EOT faults. By estimating EOT more reliably, torque estimation accuracy and engine torque limiting for temperature protecting is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 depicts an example mapping of a relationship between the null duty cycle and EOT.

DETAILED DESCRIPTION

Figure 1:
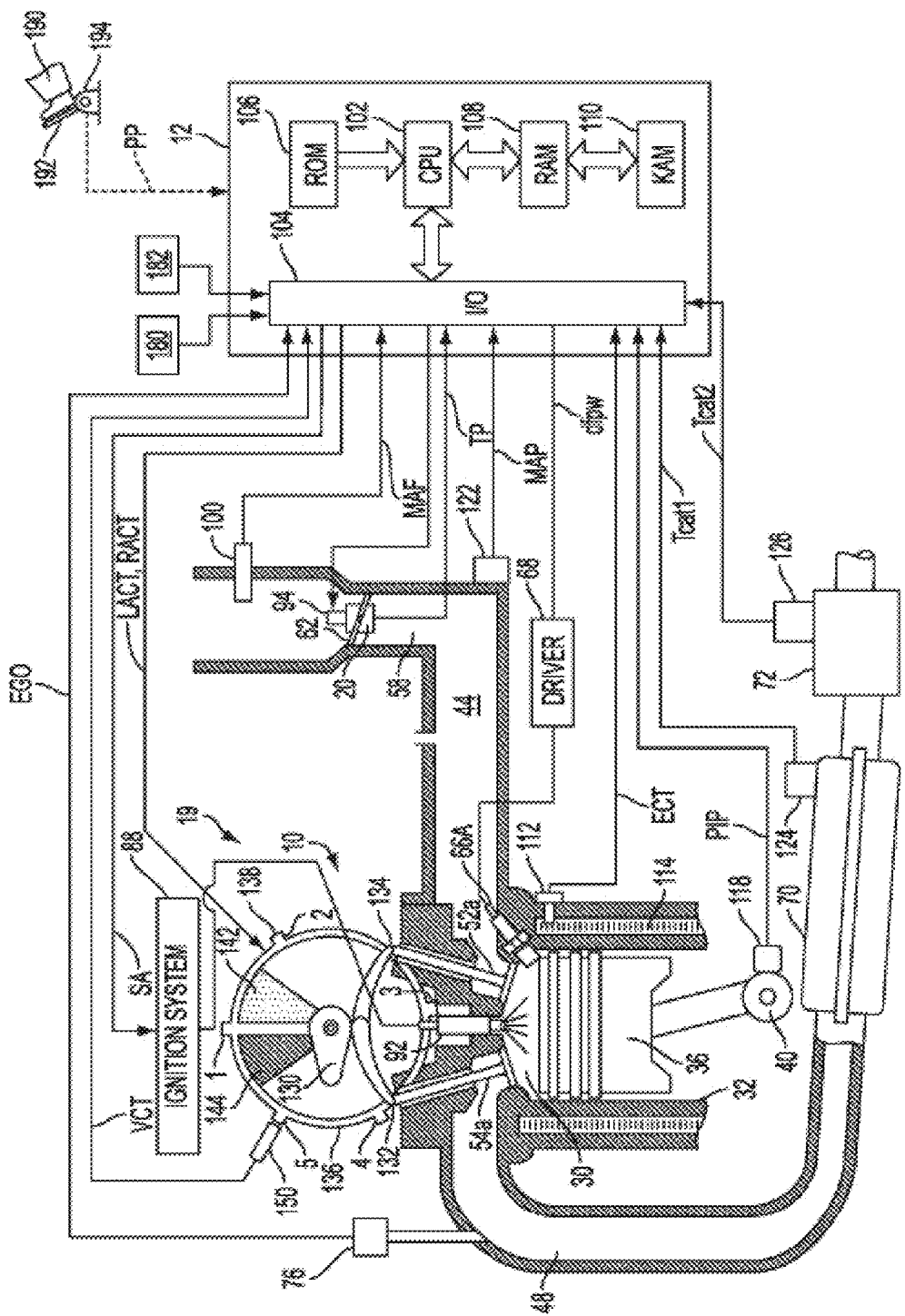
FIG. 1 shows an example engine system having a variable camshaft timing (VCT) device.
Figure 2:
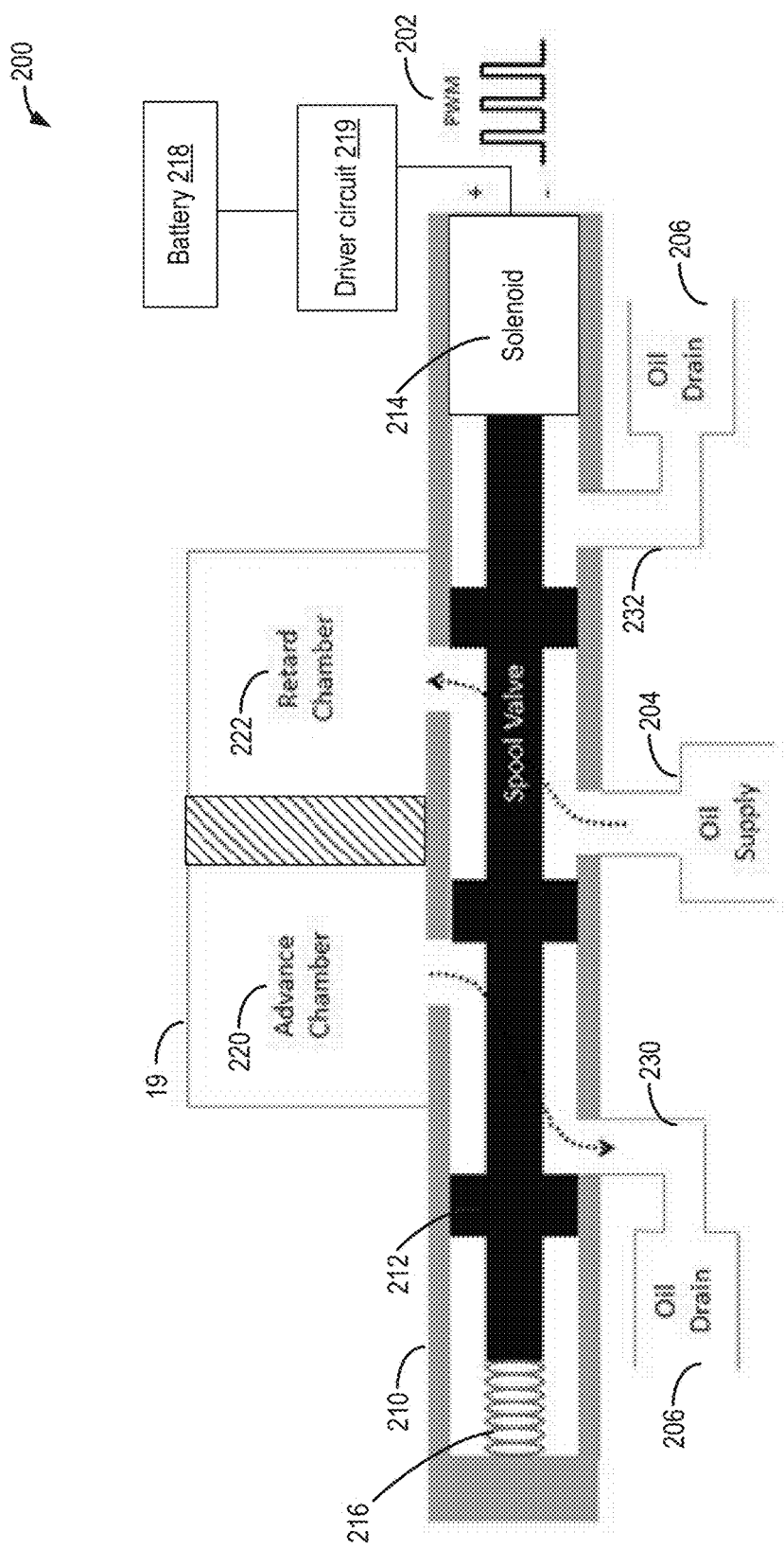
FIG. 2 depicts an example oil control valve (OCV) of the VCT.

The following description relates to systems and methods for controlling an engine of a vehicle, the engine having a variable cam timing (VCT) device that is actuated using oil pressure via an oil control valve, as shown in FIGS. 1-2. An engine controller may be configured to perform a control routine, such as the example routine of FIG. 4, to estimate an engine oil temperature (EOT) during conditions when default EOT estimation methods are unreliable, such as due to sensor degradation or due to unreliable sensor output. The controller may apply a pulse width signal to learn a null duty cycle of the oil control valve (FIG. 5) and then infer the EOT based on a mapped relationship between VCT duty cycle and EOT (FIG. 6). Example EOT estimations are shown with reference to the examples of FIGS. 7-10.

FIG. 1 depicts an example embodiment of a combustion chamber or cylinder of internal combustion engine 10. FIG. 1 shows that engine 10 may receive control parameters from a control system including controller 12, as well as input from a vehicle operator 190 via an input device 192. In this example, input device 192 includes an accelerator pedal and a pedal position sensor 194 for generating a proportional pedal position signal PP.

Cylinder (herein also "combustion chamber") 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10. Housing 136 is hydraulically coupled to crankshaft 40 via a timing chain or belt (not shown).

Cylinder 30 can receive intake air via intake manifold or air passages 44. Intake air passage 44 can communicate with other cylinders of engine 10 in addition to cylinder 30. In some embodiments, one or more of the intake passages may include a boosting device such as a turbocharger or a supercharger. A throttle system including a throttle plate 62 may be provided along an intake passage of the engine for varying the flow rate and/or pressure of intake air provided to the engine cylinders. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control.

Combustion chamber 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Exhaust manifold 48 can receive exhaust gases from other cylinders of engine 10 in addition to cylinder 30. Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. Emission control device 72 is shown positioned downstream of catalytic converter 70. Emission control device 72 may be a three-way catalyst, a NOx trap, various other emission control devices or combinations thereof.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, fuel injector 66A is shown coupled directly to cylinder 30 for injecting fuel directly therein in proportion to the pulse width of signal dfpw received from controller 12 via electronic driver 68. In this manner, fuel injector 66A provides what is known as direct injection (hereafter also referred to as "DI") of fuel into cylinder 30. The fuel injector may be mounted in the side of the combustion chamber (as shown) or in the top of the combustion chamber (near the spark plug), for example. Fuel may be delivered to fuel injector 66A by a fuel system including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle 20; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 20; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of catalytic converter 70 is provided by temperature sensor 124 and temperature Tcat2 of emission control device 72 is provided by temperature sensor 126. In an alternate embodiment, temperature Tcat1 and temperature Tcat2 may be inferred from engine operation.

Continuing with FIG. 1, a variable camshaft timing (VCT) system 19 is shown. In this example, an overhead cam system is illustrated, although other approaches may be used. Specifically, camshaft 130 of engine 10 is shown communicating with rocker arms 132 and 134 for actuating intake valves 52a, 52b and exhaust valves 54a, 54b. In the depicted example, VCT system 19 is oil pressure actuated (OPA), wherein actuation of a camshaft phaser of the VCT system is enabled via oil pressure from oil flow through a spool valve. In alternate examples, VCT system 19 may be cam torque actuated (CTA) wherein actuation of the camshaft phaser is enabled via cam torque pulses. By adjusting a plurality of hydraulic valves to thereby direct a hydraulic fluid, specifically engine oil, into the cavity (such as an advance chamber or a retard chamber) of a camshaft phaser, valve timing may be changed, that is advanced or retarded. As further elaborated herein, the operation of the hydraulic control valves may be controlled by respective control solenoids. Specifically, an engine controller may transmit a signal to the solenoids to move a spool valve (herein also referred to as an oil control valve, OCV) that regulates the flow of oil through the phaser cavity. As used herein, advance and retard of cam timing refer to relative cam timings, in that a fully advanced position may still provide a retarded intake valve opening with regard to top dead center, as just an example. An example of the operation of the OCV of the VCT system 19 is shown with reference to FIGS. 2-3.

Camshaft 130 is hydraulically coupled to housing 136. Housing 136 forms a toothed wheel having a plurality of teeth 138. In the example embodiment, housing 136 is mechanically coupled to crankshaft 40 via a timing chain or belt (not shown). Therefore, housing 136 and camshaft 130 rotate at a speed substantially equivalent to each other and synchronous to the crankshaft. In an alternate embodiment, as in a four stroke engine, for example, housing 136 and crankshaft 40 may be mechanically coupled to camshaft 130 such that housing 136 and crankshaft 40 may synchronously rotate at a speed different than camshaft 130 (e.g. a 2:1 ratio, where the crankshaft rotates at twice the speed of the camshaft). In the alternate embodiment, teeth 138 may be mechanically coupled to camshaft 130. By manipulation of the hydraulic coupling as described herein, the relative position of camshaft 130 to crankshaft 40 can be varied by hydraulic pressures in retard chamber 142 and advance chamber 144. By allowing high pressure hydraulic fluid to enter retard chamber 142, the relative relationship between camshaft 130 and crankshaft 40 is retarded. Thus, intake valves 52a, 52b and exhaust valves 54a, 54b open and close at a time later than normal relative to crankshaft 40. Similarly, by allowing high pressure hydraulic fluid to enter advance chamber 144, the relative relationship between camshaft 130 and crankshaft 40 is advanced. Thus, intake valves 52a, 52b, and exhaust valves 54a, 54b open and close at a time earlier than normal relative to crankshaft 40.

While this example shows a system in which the intake and exhaust valve timing are controlled concurrently, variable intake cam timing, variable exhaust cam timing, dual independent variable cam timing, dual equal variable cam timing, or other variable cam timing may be used. Further, variable valve lift may also be used. Further, camshaft profile switching may be used to provide different cam profiles under different operating conditions. Further still, the valve-train may be roller finger follower, direct acting mechanical bucket, electrohydraulic, or other alternatives to rocker arms.

Continuing with the variable cam timing system, teeth 138, rotating synchronously with camshaft 130, allow for measurement of relative cam position via cam timing sensor 150 providing signal VCT to controller 12. Teeth 1, 2, 3, and 4 may be used for measurement of cam timing and are equally spaced (for example, in a V-8 dual bank engine, spaced 90 degrees apart from one another) while tooth 5 may be used for cylinder identification. In addition, controller 12 sends control signals (LACT, RACT) to conventional solenoid valves (not shown) to control the flow of hydraulic fluid either into retard chamber 142, advance chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 1 merely shows one cylinder of a multi-cylinder engine, and that each cylinder has its own set of intake/exhaust valves, fuel injectors, spark plugs, etc.

FIG. 2 shows an example oil control valve (OCV) 200 of the VCT system 19 of FIG. 1. OCV 200 is configured as a spool valve (and may be referred to as a spool valve herein) having a spool 212 positioned within housing 210. As depicted, the spool 212 is spring loaded within the housing 210 via spring 216. A position of the spool valve is adjusted by an engine controller by sending a PWM duty cycle command 202 to a driver circuit 219 that is placed between the battery 218, which provides the supply voltage, and the solenoid 214. The driver circuit applies PWM voltage to the solenoid 214, which drives a current through the solenoid 214, and the solenoid exerts an external force to the spool valve, where the magnitude of the force is proportional to the magnitude of the current passing through the solenoid 214. Hence, the magnitude of the current, and therefore the force exerted to the spool valve, depends on the resistance of the solenoid, the supply voltage, and the commanded PWM duty cycle. The position of the spool valve is thus controlled by adjusting the PWM duty cycle, as the resistance of the solenoid and the supply voltage are non-adjustable quantities.

By varying the position of the spool valve, oil is directed to or from the pressure chambers that drive the cam wheel to rotate in retard or advance direction, and thereby the rotational velocity of the cam wheel is proportional to the oil pressure in the chamber. For example, by adjusting the position of the spool valve, oil may be supplied to the advance chamber 220 and drained from the retard chamber 222 via oil supply 204 and oil passage 232 respectively to advance valve timing. As another example, by adjusting the position of the spool valve, oil may be directed into retard chamber 222 from oil supply 204 and drained from advance chamber 220 via oil passage 230 to retard valve timing. Finally, by adjusting the position of the spool valve, oil passages 230, 232 to the advance and retard chambers can be blocked so that the valve timing remains stationary. The duty cycle that needs to be applied to keep the spool valve in this position is referred to as the null duty cycle.

Figure 3:
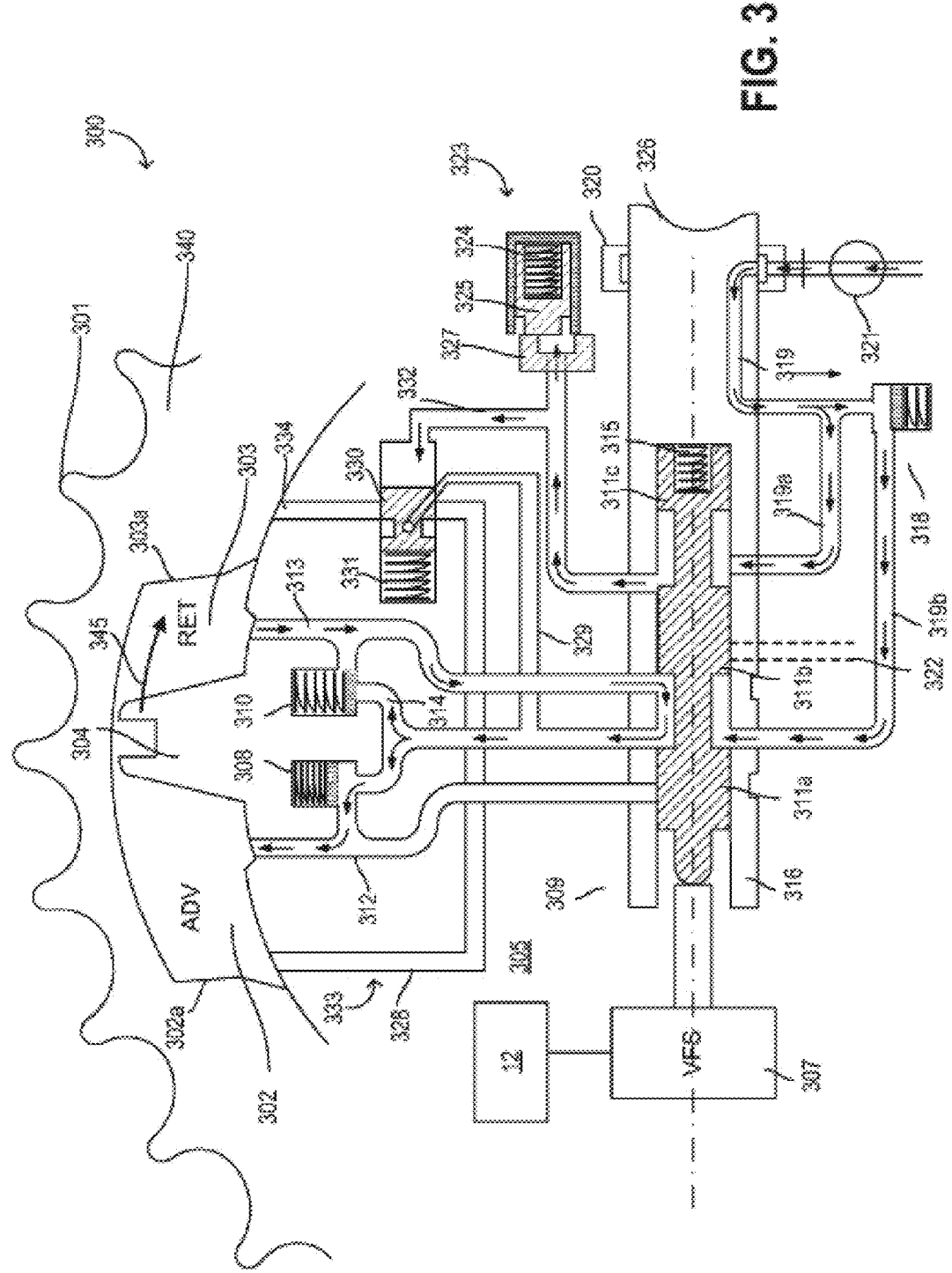
FIG. 3 depicts an example VCT phaser system.

FIG. 3 shows a VCT phaser 300 in an advanced position. In one example, VCT phaser 300 may include VCT phaser 19 of FIG. 1. FIG. 3 further depicts a solenoid-operated spool valve 309 coupled to VCT phaser 300. Spool valve 309 is shown positioned in an advance region of the spool as a non-limiting example. It will be appreciated that the spool valve may have an infinite number of intermediate positions, such as positions in an advance region, null region, and detent region of the spool (as elaborated below). The position of the spool valve may not only control a direction of VCT phaser motion but, depending on the discrete spool position, may also control the rate of VCT phaser motion.

Internal combustion engines have employed various mechanisms to vary the angle between the camshaft and the crankshaft for improved engine performance or reduced emissions. The majority of these variable camshaft timing (VCT) mechanisms use one or more "vane phasers" on the engine camshaft (or camshafts, in a multiple-camshaft engine), such as VCT phaser 300. VCT phaser 300 may have a rotor 305 with one or more vanes 304, mounted to the end of a camshaft 326, surrounded by a housing assembly 340 with the vane chambers into which the vanes fit. In an alternate example, vanes 304 may be mounted to the housing assembly 340, and the chambers may be mounted in the rotor assembly 305. The housing's outer circumference 301 forms the sprocket, pulley or gear accepting drive force through a chain, belt, or gears, usually from the crankshaft, or from another camshaft in a multiple-cam engine.

VCT phaser 300 is depicted as an oil pressure actuated phaser. Therein, oil pressure is applied on the camshaft via the pressure chambers 302 and 303 to move the vane 304. The advance and retard chambers 302, 303 are arranged to resist pressure pulses on the camshaft 326 and are alternately pressurized by the oil pressure pulses. Spool valve 309 allows the vane 304 in the phaser to move by permitting fluid flow from the advance chamber 302 to the retard chamber 303 or vice versa, depending on the desired direction of movement. For example, when the desired direction of movement is in the advance direction, spool valve 309 allows the vane to move by permitting fluid flow from the retard chamber to the advance chamber. In comparison, when the desired direction of movement is in the retard direction, spool valve 309 allows the vane to move by permitting fluid flow from the advance chamber to the retard chamber.

The housing assembly 340 of VCT phaser 300 has an outer circumference 301 for accepting drive force. The rotor assembly 305 is connected to the camshaft 326 and is coaxially located within the housing assembly 340. The rotor assembly 305 has a vane 304 separating a chamber formed between the housing assembly 340 and the rotor assembly 305 into an advance chamber 302 and a retard chamber 303. The vane 304 is capable of rotation to shift the relative angular position of the housing assembly 340 and the rotor assembly 305. Additionally, a hydraulic detent circuit 333 and a locking pin circuit 323 are also present. The hydraulic detent circuit 333 and the locking pin circuit 323 are fluidly coupled making them essentially one circuit as discussed above, but will be discussed separately for simplicity and for better distinguishing their distinct functions. The hydraulic detent circuit 333 includes a spring 331 loaded piloted valve 330, an advance detent line 328 that connects the advance chamber 302 to the piloted valve 330 and a common line 314, and a retard detent line 334 that connects the retard chamber 303 to the piloted valve 330 and the common line 314. The advance detent line 328 and the retard detent line 334 are a predetermined distance or length from the vane 304. The piloted valve 330 is in the rotor assembly 305 and is fluidly connected to the locking pin circuit 323 and supply line 319 a through connecting line 332. The locking pin circuit 323 includes a locking pin 325, connecting line 332, the piloted valve 330, supply line 319a, and exhaust line 322.

The piloted valve may be actuated between two positions, a first position which may correspond to a closed or off position, and a second position which may correspond to an open or on position. The piloted valve may be commanded to these positions by the spool valve. In the first position, the piloted valve is pressurized by engine generated oil pressure in line 332, which positions the piloted valve such that fluid is blocked from flowing between the advance retard chambers through the piloted valve and the detent circuit 333. In the second position, engine generated oil pressure in line 332 is absent. The absence of pressure in line 332 enables spring 331 to position the piloted valve so that fluid is allowed to flow between the detent line from the advance chamber and the detent line from the retard chamber through the piloted valve and a common line, such that the rotor assembly is moved to and held in the locking position.

The locking pin 325 is slidably housed in a bore in the rotor assembly 305 and has an end portion that is biased towards and fits into a recess 327 in the housing assembly 340 by a spring 324. Alternatively, the locking pin 325 may be housed in the housing assembly 340 and may be spring 324 biased towards a recess 327 in the rotor assembly 305. The opening and closing of the hydraulic detent circuit 333 and pressurization of the locking pin circuit 323 are both controlled by the switching/movement of spool valve 309.

Spool valve 309 includes a spool 311 with cylindrical lands 311a, 311b, and 311c slidably received in a sleeve 316 within a bore in the rotor 305 and pilots in the camshaft 326. One end of the spool contacts spring 315 and the opposite end of the spool contacts a pulse width modulated variable force solenoid (NTS) 307. The solenoid 307 may also be linearly controlled by varying duty cycle, current, voltage or other methods as applicable. Additionally, the opposite end of the spool 311 may contact and be influenced by a motor, or other actuators.

The position of the spool 311 is influenced by spring 315 and the solenoid 307 controlled by controller 12. Further detail regarding control of the phaser is discussed below. The position of the spool 311 controls the motion of the phaser, including a direction of motion as well as a rate of motion. For example, the position of the spool determines whether to move the phaser towards the advance position, towards a holding position, or towards the retard position. In addition, the position of the spool determines whether the locking pin circuit 323 and the hydraulic detent circuit 333 are open (on) or closed (off). In other words, the position of the spool 311 actively controls piloted valve 330. The spool valve 309 has an advance mode, a retard mode, a null mode, and a detent mode. These modes of control may be directly associated with regions of positioning. Thus, particular regions of the spool valve's stroke may allow the spool valve to operate in the advance, retard, null and detent modes. In the advance mode, the spool 311 is moved to a position in the advance region of the spool valve, thereby enabling fluid to flow from the retard chamber 303 through the spool 311 on to the advance chamber 302, while fluid is blocked from exiting the advance chamber 302. In addition, the detent circuit 333 is held off or closed. In the retard mode, the spool 311 is moved to a position in the retard region of the spool valve, thereby enabling fluid to flow from the advance chamber 302 through the spool 311 on to the retard chamber 303, while fluid is blocked from exiting the retard chamber 303. In addition, the detent circuit 333 is held off or closed. In the null mode, the spool 311 is moved to a position in the null region of the spool valve, thereby blocking the exit of fluid from each of the advance and retard chambers 302, 303, while continuing to hold the detent circuit 333 off or closed. In the detent mode, the spool is moved to a position in the detent region. In the detent mode, three functions occur simultaneously. The first function in the detent mode is that the spool 311 moves to a position in which spool land 311b blocks the flow of fluid from line 312 in between spool lands 311a and 311b from entering any of the other lines and line 313, effectively removing control of the phaser from the spool valve 309. The second function in detent mode is the opening or turn on of the detent circuit 333. As such, the detent circuit 333 has complete control over the phaser moving to advance or retard positions, until the vane 304 reaches an intermediate phase angle position. The third function in the detent mode is to vent the locking pin circuit 323, allowing the locking pin 325 to engage in the recess 327. The intermediate phase angle position, herein also referred to as the mid-lock position and also as the locking position, is defined as a position when the vane 304 is between advance wall 302a and retard wall 303a, the walls defining the chamber between the housing assembly 340 and the rotor assembly 305. The locking position may be a position anywhere between the advance wall 302a and retard wall 303a and is determined by a position of detent passages 328 and 334 relative to the vane 304. Specifically, the position of detent passages 328 and 334 relative to the vane 304 define a position wherein neither passage may be exposed to advance and retard chambers 302 and 303, thus fully disabling communication between the two chambers when the piloted valve is in the second position and the phasing circuit is disabled. Commanding the spool valve to the detent region may also be referred to as commanding a "hard lock" or "hard locking" the cam phaser, in reference to the hardware component (locking pin) involved in locking the cam phaser being engaged at the mid-lock position.

Based on the duty cycle of the pulse width modulated variable force solenoid 307, the spool 311 moves to a corresponding position along its stroke. In one example, when the duty cycle of the variable force solenoid 307 is approximately 30%, 50% or 100%, the spool 311 is moved to positions that correspond with the retard mode, the null mode, and the advance mode, respectively and the piloted valve 330 is pressurized and moved from the second position to the first position, while the hydraulic detent circuit 333 is closed, and the locking pin 325 is pressurized and released. As another example, when the duty cycle of the variable force solenoid 307 is set to 0%, the spool 311 is moved to the detent mode such that the piloted valve 330 vents and moves to the second position, the hydraulic detent circuit 333 is opened, and the locking pin 325 is vented and engaged with the recess 327. By choosing a duty cycle of 0% as the extreme position along the spool stroke to open the hydraulic detent circuit 333, vent the piloted valve 330, and vent and engage the locking pin 325 with the recess 327, in the event that power or control is lost, the phaser may default to a locked position, improving cam phaser position certainty. It should be noted that the duty cycle percentages listed above are provided as non-limiting examples, and in alternate embodiments, different duty cycles may be used to move the spool of the spool valve between the different spool regions. For example, the hydraulic detent circuit 333 may alternatively be opened, the piloted valve 330 vented, and the locking pin 325 vented and engaged with the recess 327 at 100% duty cycle. In this example, the detent region of the spool valve may be adjacent to the advance region instead of the retard region. In another example, the detent mode may be at a 0% duty cycle, and duty cycles of approximately 30%, 50%, and 100% may move spool 311 to positions that correspond with the advance mode, the null mode, and the retard mode. Likewise in this example, the advance region of the spool valve is adjacent to the detent region.

During selected conditions, a controller may map one or more regions of the spool by varying the duty cycle commanded to the spool valve and correlating it with corresponding changes in phaser position. For example, a transitional region between the detent region and the retard region of the spool, herein also referred to as the "no-fly zone", may be mapped by correlating motion of the spool valve out of the detent region into the retard region with motion of the phaser from the mid-lock position towards a retarded position.

FIG. 3 shows phaser 300 moving towards the advance position. To move the phaser towards the advance position, the duty cycle of the spool valve is increased to greater than 50%, and optionally up to 100%. As a result, the force of the solenoid 307 on the spool 311 is increased, and the spool 311 is moved to the right, towards an advance region and operated in an advance mode, until the force of the spring 315 balances the force of the solenoid 307. In the advance mode shown, spool land 311a blocks line 312 while lines 313 and 314 are open. In this scenario, oil pressure pulses pressurize the retard chamber 303, causing fluid to move from the retard chamber 303 into advance chamber 302, thereby moving vane 304 in the direction shown by arrow 345. Hydraulic fluid exits from the retard chamber 303 through line 313 to the spool valve 309, between spool lands 311a and 311b and recirculates back to central line 314 and line 312 leading to the advance chamber 302. The piloted valve is held in the first position, blocking detent lines 328 and 334.

In an alternate example, to move towards the phaser towards the retard position, the duty cycle of the spool valve is decreased to lower than 50%, and optionally up to 30%. As a result, the force of the solenoid 307 on the spool 311 is decreased, and the spool 311 is moved to the left, towards a retard region and operated in a retard mode, until the force of the spring 315 balances the force of the solenoid 307. In the retard mode, spool land 311b blocks line 313 while lines 312 and 314 are open. In this scenario, oil pressure pulses pressurize the advance chamber 302, causing fluid to move from the advance chamber 302 into retard chamber 303, and thereby moving vane 304 in a direction opposite to that shown by arrow 345. Hydraulic fluid exits from the advance chamber 302 through line 312 to the spool valve 309, between spool lands 311 a and 311 b and recirculates back to central line 314 and line 313 leading to the retard chamber 303. The piloted valve is held in the first position, blocking detent lines 328 and 334.

In this way, the components of FIGS. 1-3 enables an engine system comprising a variable cam timing device including a cam, an oil pressure-actuated phaser, a camshaft, a spool valve, and a solenoid; a cam position sensor coupled to the cam; a battery; an engine coolant temperature sensor; an intake air charge temperature sensor; a mass air flow sensor, and a controller. The controller may include computer-readable instructions stored on non-transitory memory for: responsive to at least one diagnostic flag related to engine oil temperature estimation being set, applying an excitation pulse to the solenoid to move the spool valve, a duty cycle of the excitation pulse adjusted to move the cam outside of a hard-stop region; measuring an angular velocity of the camshaft following the applying via the cam position sensor; estimating a null duty cycle of the spool valve based on the applied duty cycle; and estimating an engine oil temperature based on a mapped relationship between the estimated null duty cycle and the measured angular velocity. The controller may include further instructions for limiting each of an upper and a lower engine speed threshold based on the estimated engine oil temperature, the upper engine speed threshold lowered and the lower engine speed threshold raised as the estimated engine oil temperature exceeds a threshold temperature. At least one diagnostic flag related to engine oil temperature estimation may be set responsive to one of degradation of the engine coolant temperature sensor, degradation of the intake air charge temperature sensor, degradation of the mass air flow sensor, corruption of the memory, and an engine warm-start condition. In one example, the mapped relationship is stored in the memory and uses a last estimated engine oil temperature, the estimated null duty cycle, and the measured angular velocity as inputs. Further, the cam may be one of an intake cam and an exhaust cam, the controller including further instructions for selecting the intake cam when the engine controller provides an intake cam shifting command; and selecting the exhaust cam when the controller provides an exhaust cam shifting command. The null duty cycle may include a duty cycle quantity that results in zero angular velocity for the VCT device outside of a hard-stop or a pin-lock position. Further, the controller may include further instructions for: responsive to no diagnostic flag related to engine oil temperature estimation being set, estimating the engine oil temperature based on an output of one or more of the engine coolant temperature sensor, the intake air charge temperature sensor, and the mass air flow sensor.

Figure 4:
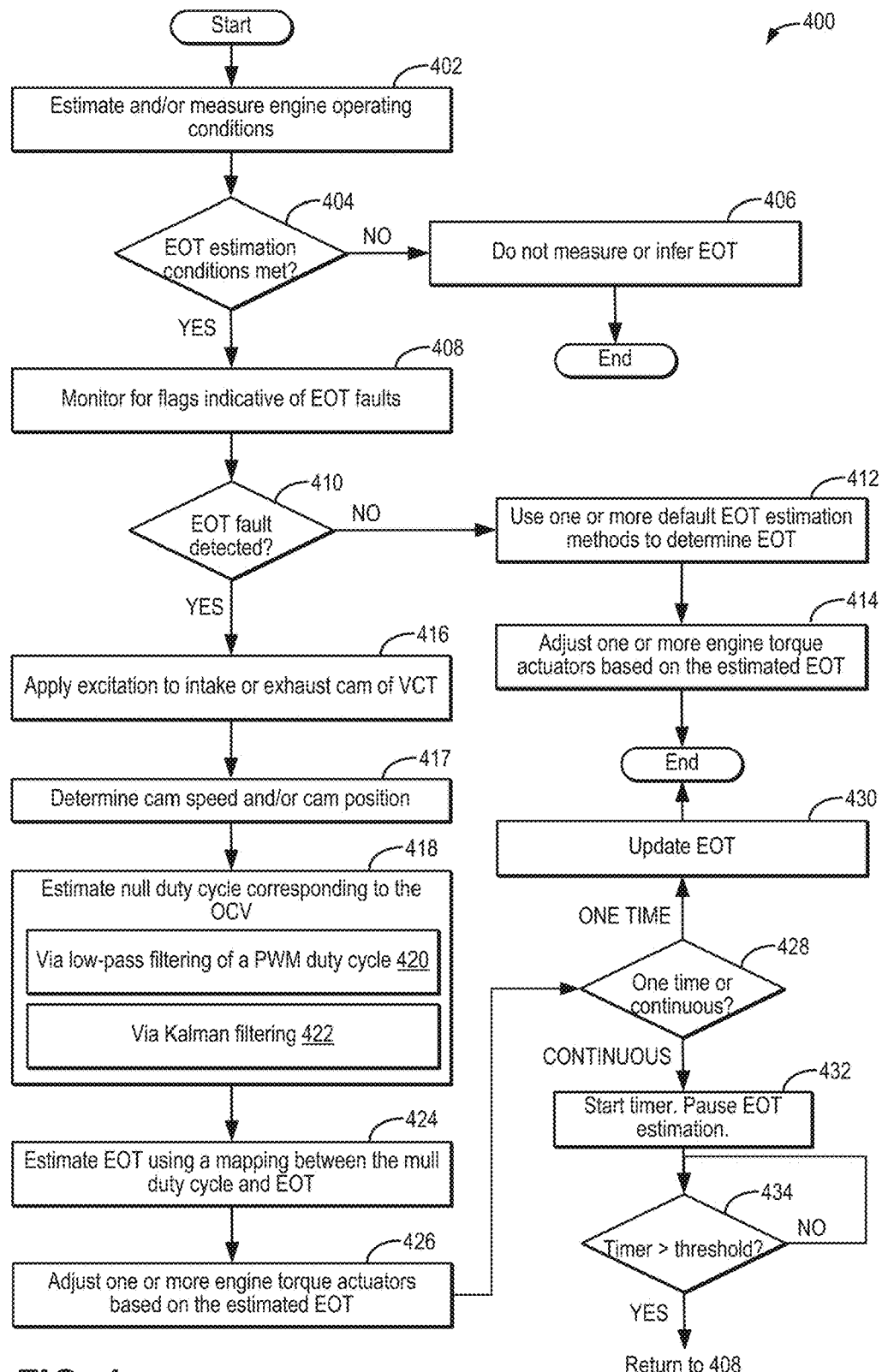
FIG. 4 shows a high-level flow chart for estimating an engine oil temperature.

Now turning to FIG. 4, an example routine 400 is described for estimating EOT via a mapped relationship between commanded solenoid duty cycle and engine oil temperature. Routine 400 may be executed by an engine controller, such as controller 12 of FIGS. 1-3, upon EOT estimation entry conditions when EOT quantities measured or inferred via existing engine sensors may not be reliable.

At 402, the routine includes estimating and/or measuring engine operating conditions. These may include, for example, determining if the engine is shut-down or running, and measuring parameters such as engine speed, engine temperature, ambient conditions (ambient temperature, pressure, humidity, etc.), torque demand, manifold pressure, manifold air flow, exhaust catalyst conditions, oil temperature, oil pressure, soak time (time elapsed since the engine was last shut-down), etc.

At 404, it may be determined if EOT estimation conditions have been met. In one example, EOT estimation may be triggered responsive to an engine start. In another example, EOT estimation may be performed while the engine is running, such as when a threshold time (or duration) of vehicle travel has elapsed since a last EOT estimation. As such, EOT estimation may be required when an engine is running, or immediately prior to (or at the time of) an engine being started, for (actual) torque estimation, boost control, determining variable camshaft (or valve) timing, scheduling and estimating positive crankcase ventilation, oil life monitoring, powertrain limiting, and powertrain protection. For example, EOT estimation may be triggered responsive to an engine controller needing to calculate the total friction and pumping torque losses of the engine, which is then used for calculating the total crankshaft torque loss, and thereafter the engine torque output. As another example, EOT estimation may be triggered after the elapse of a threshold duration of engine operation for powertrain limiting and protection so as to reduce overheating or under-heating of the powertrain.

If EOT estimation conditions are not met, at 406, the engine controller does not measure or infer EOT. For example, if the engine was shutdown, the engine remains shutdown. Likewise, if the engine is running, the engine continues to run without updating the last EOT estimate stored in the engine controller's memory. Further, the engine controller continues to adjust engine actuators based on the last estimated EOT stored in the controller's memory. For example, torque output and powertrain limiting may be performed based on the last estimated EOT.

If EOT estimation conditions are met, at 408, the controller monitors for various fault flags generated by relevant features of the engine system, the fault flags indicating whether the (last) measured/inferred EOT value is reliable. For example, the controller may retrieve all the diagnostic codes and flags that have been set, and determine if any of them are related to EOT estimation. As such, EOT may be measured directly via an EOT sensor coupled to an engine oil sump. However, such EOT sensors may be expensive and prone to degradation. Therefore in some engine systems, EOT may be inferred indirectly via one or more other engine sensors, such as an intake air charge temperature (ACT) sensor and/or an engine coolant temperature (ECT) sensor and/or an intake mass air flow (MAF) sensor. Therein, the EOT may be inferred based on the output of one or more of the ACT sensor, the ECT sensor, and the MAF sensor and a last EOT estimate stored in the memory of the controller, such as in the KAM.

Estimating EOT based on one or more of the ACT sensor, ECT sensor, and MAF sensor includes.

As one example, the fault flags retrieved may include a KAM error fault flag indicating that the non-volatile memory of the controller (e.g., the KAM) is corrupt and therefore any variable stored in the KAM is unreliable. In still other examples, the fault flag may indicate a faulty condition in the engine's electronic control module that is not limited to the keep alive memory.

As another example, the fault flag may include degradation of a sensor used to directly or indirectly measure the engine oil temperature. For example, an ACT sensor fault flag may be retrieved indicating either that an air charge temperature (ACT) sensor coupled to the engine intake passage is degraded, the output of the ACT sensor is corrupted, or that the engine operating conditions are such that an EOT estimated based on an output of the ACT sensor is not reliable. ACT may be used as an input to a thermal model that is used to infer the EOT, with ACT being used as a surrogate for the ambient temperature. The ACT value may not be reliable if the ACT sensor is degraded or failed, or the data transmission between the ACT sensor and the PCM is damaged (such as due to KAM corruption). In one example, the engine operating conditions may be such that the output of the ACT sensor is reliable for ACT estimation but not reliable for EOT estimation.

As yet another example, the fault flag may include an ECT sensor fault flag indicating either that an engine coolant temperature (ECT) sensor coupled to the engine coolant system is degraded, the output of the ECT sensor is corrupted, or that the engine operating conditions are such that an EOT estimated based on an output of the ECT sensor is not reliable. In one example, the engine operating conditions may be such that the output of the ECT sensor is reliable for ECT estimation (such as for estimating an engine temperature), but not reliable for EOT estimation. As an example, the output of the ECT sensor may not be reliable during a warm engine start condition, but may be reliable during a cold engine start condition. For example, the ECT value estimated during vehicle start may not be transmitted to the controller sufficiently fast, and as a result, the EOT infer logic may be initialized with a default ECT value (such as a default value of 60 degrees Celsius). While this does not affect engine cold starts, during warm starts where the actual ECT value is significantly higher than the default value (e.g., where the actual ECT value is at or above 190 degrees Celsius), the EOT estimated may be off by ~50% of its true value, because the initial/default value of ECT is used in the initialization of the inferred EOT thermal model (instead of the actual ECT value).

As yet another example, the fault flag may include a MAF sensor fault flag indicating either that a mass air flow (MAF) sensor coupled to the engine intake is degraded, the output of the MAF sensor is corrupted, or that the engine operating conditions are such that an EOT estimated based on an output of the MAF sensor is not reliable. In one example, the engine operating conditions may be such that the output of the MAF sensor is reliable for MAF estimation (such as for estimating an intake air charge amount or flow), but not reliable for EOT estimation.

In still another example wherein the vehicle is equipped with an EOT sensor, the fault flag may include an EOT sensor fault flag indicating either that the EOT sensor coupled to the engine oil sump is degraded, or that the output of the EOT sensor is corrupted.

In one example, during engine starts, an engine controller may use a combination of the soak time, the measured engine coolant temperature, and the last sample of EOT before the engine was turned off, which is stored in the KAM, to calculate an initial estimate for the EOT inference logic. If either the last EOT value or the soak time value is corrupt due to a KAM error, if the ECT sensor is degraded, or if the engine coolant is significantly warmer than the engine oil (as may occur during warm engine starts), the initial EOT estimate may be incorrect. This can lead to an inaccurate inferred EOT value during the first several minutes of vehicle operation. A KAM error would also cause the same effect. For example, if the battery is disconnected from the PCM so that the KAM is reset, the soak timer will be reset, and the initialization of the inferred EOT, which depends on the soak time, will be inaccurate. In still other examples, at 410, it may be determined if an engine warm-start condition is present.

If an EOT fault is not detected, such as may occur when no fault flags relating to EOT estimation are retrieved (or if an engine warm-start condition is not confirmed), then at 412, the routine includes estimating or measuring EOT via any one or more of the default EOT estimation methods. For example, EOT may be measured directly based on the output of the EOT sensor. As another example, EOT may be inferred from measured ACT or measured ECT or measured MAF. The thermal model for the EOT infer logic may be summarized according to the following equation as:

$$EOT = EOT\_ss + k\_ect*(ect-200) + k\_amb*(act-100) \quad (1)$$

wherein EOT_ss is an adjusted steady-state value of EOT calculated (through a 2-D look-up table) based on engine speed and engine load. EOT is then low-pass filtered to get the final value EOT_filt to be used by the powertrain features. The time constant of this low-pass filter also depends on the engine speed. So the EOT inference calculation is dependent on the engine speed in multiple ways, in addition to the ECT and ACT during normal operation.

Then, at 414, the controller may adjust one or more engine torque actuators based on the estimated EOT. For example, the controller may compare the estimated EOT to upper and lower thresholds, and based on the comparison, the controller may select an engine torque actuator, as well as an amount and direction of adjustment of the selected torque actuator. As an example, responsive to the estimated EOT being higher than an upper threshold, an engine output may be limited, boost pressure may be limited, and/or an engine torque provided responsive to an operator torque demand may be limited. As another example, an engine idling speed may be limited to reduce engine overheating as well as for engine oil temperature low protection. As yet another example, upper and lower engine speed thresholds of a permissible engine speed range may be limited (e.g., by reducing the upper engine speed threshold and/or raising the lower engine speed threshold) if the EOT is too low (e.g., below a lower threshold) or too high (e.g., above an upper threshold) in order to protect the engine from extreme temperature conditions.

Returning to 410, if an EOT fault is detected, such as when a flag or diagnostic code corresponding to the EOT estimation is set (or if warm start conditions are confirmed), it may be inferred that the memory and/or sensor signals relevant in the calculation of EOT are corrupted and unreliable. During such conditions, an alternate approach may be used to infer EOT so as to enable engine torque and powertrain temperature control. As elaborated herein below, the inventors have recognized that during such conditions, the temperature dependency of the variable camshaft timing (VCT) system's oil control valve (OCV), configured as a solenoid valve, may be leveraged to use the OCV as an EOT sensor.

It will be appreciated that while the depicted routine shows EOT estimation via use of a VCT system's OCV as a sensor, in still other examples, the EOT estimation method may be used as a main tool to estimate the engine oil temperature. Alternatively, the method could be used in conjunction with the existing tools as an auxiliary method to serve as an additional EOT source, which could be used in situations where the EOT quantities provided by the sensors are not reliable, or when EOT quantities provided by the existing tools may not be reliable.

If any EOT fault is detected, then at 416, the method includes applying an excitation profile (such as an excitation signal or excitation pulse in the form of a cam position command, voltage, electrical current, or pulse-width modulated duty cycle) to an intake or exhaust cam of the VCT device. Specifically, the excitation signal is applied to the variable camshaft timing solenoid valve coupled to the intake or exhaust cam. The excitation profile or pulse applied may include an amplitude, a frequency, and a duration of application. The controller may use a battery coupled to the engine or driveline (such as a battery coupled to the engine's alternator, or a battery of an electric motor coupled to the engine) as a power source to apply a pulse-width-modulation (PWM) duty cycle to the solenoid of the oil control (spool) valve (of the VCT device), the PWM duty cycle driving a current through the solenoid to vary a position of the spool valve. The PWM duty cycle may be selected so that a null duty cycle of the OCV can be determined. In particular, the applied duty cycle moves the one of the intake and exhaust cam outside of a hard-stop (or pin-lock) position. As used herein, the null duty cycle refers to a duty cycle quantity that results in zero angular velocity for the VCT device outside of the hard-stop or pin-lock position. For example, a cam position reference command may be provided to a closed-loop VCT controller so that the cam position is held at a pre-determined set-point. The null duty cycle can then be determined based on the PWM duty cycle applied to the solenoid by the VCT controller in order to maintain the cam position at the set-point location. In this way, applying the excitation signal may include applying, via the closed-loop controller, a reference angular position command to vary angular velocity of the camshaft of the VCT device. Then, the controller may measure the camshaft angular velocity and the duty cycle (or voltage or electric current of the excitation signal) applied to the solenoid by the closed-loop controller. In another example, the PWM duty cycle may be adjusted directly without using a closed-loop controller in order to determine the null duty cycle. Duty cycle pulses of incrementally increasing magnitudes may be applied to the solenoid oil control valve for fixed periods of time, and the measured cam position signal can be monitored to determine the null duty cycle. Further still, applying the excitation signal may include applying an incrementally increasing duty cycle, voltage, or electrical current to the solenoid of the spool valve and measuring the camshaft angular velocity following each incremental increase.

In one example, the excitation profile applied (which may be applied as a duty cycle, a voltage, or an electrical current) may depend on the particular approach or parameter that is intended to be used to infer the EOT. For example, for a null duty cycle based approach, the excitation profile may be a step reference command, as elaborated with reference to the example of FIG. 5 (at 504). The excitation profile may be a ramp command with a specific commanded cam speed. Therein, the null duty cycle approach may be a limiting or special case of this with a specific ramp command having a commanded cam speed of 0 degrees per second.

In one example, the controller may select between the intake cam and the exhaust cam for applying the excitation profile based on the ability to apply the excitation profile in a non-intrusive manner. That is, without the ability to apply an excitation pulse (which interferes with the VCT system for a brief period of time), and instead, using the VCT command profiles that are inherent with the normal operation of the engine. In this case, the controller may select the intake cam if the engine requests an intake cam motion, and select the exhaust cam if the engine controller requests an exhaust cam motion.

The inventors herein have recognized that there is a relationship, or defined mapping, between the PWM duty cycle (DC) applied to the solenoid of the spool valve and the angular velocity of the cam wheel. Further, this mapping can be characterized by applying a known PWM duty cycle signal and measuring the resulting cam wheel angular velocity, assuming a constant solenoid resistance and known battery voltage. In particular, the PWM duty cycle changes the position of the spool valve, which in turn adjusts the oil pressure inside the pressure chambers of the OCV, which in turn drives the angular velocity of the cam wheel relative to the camshaft. The angular velocity of the cam wheel can then be measured by using the cam position sensor. Since the solenoid resistance varies with the solenoid temperature, the solenoid resistance is not a constant term, but is rather varying with the solenoid temperature. Furthermore, due to the proximity of the engine oil to the solenoid, the solenoid resistance is largely driven by the engine oil temperature near the OCV. Therefore by mapping the relationship, the EOT can be inferred reliably without requiring any of the default sensors, such as an EOT sensor, ECT sensor, or ACT sensor. In particular, after applying an excitation signal to the solenoid valve of a VCT device, EOT may be estimated from a mapped relationship, stored in non-volatile memory, the mapping relating camshaft solenoid duty cycle and camshaft angular velocity of the VCT device to engine oil temperature. Mapping the relationship further includes mapping a relationship between EOT and the null duty cycle of the OCV.

At 417, the method includes, as the PWM duty cycle is applied, determining a cam position and/or cam speed. For example, the controller may refer to an output of a cam position sensor coupled to the excited intake cam or exhaust cam to determine a change in position of the cam from an initial position, before the excitation PWM duty cycle was applied, to a final position of the cam after the excitation pulse is applied. In another example, the output of the cam position sensor may be used to determine a direction of cam movement and a rate of change in the cam position (such as a rate of change in the cam position towards either a retard or an advance position). Further still, the cam position sensor may be used to measure the camshaft angular velocity.

At 418, the method includes determining a null duty cycle corresponding to the OCV based on the PWM duty cycle applied to the solenoid. The null duty cycle refers to the duty cycle that needs to be applied to the solenoid in order to maintain the cam position at a constant position (excluding the pin lock positions such as 0 deg, or the mid-lock position, where the locking mechanism keeps the cam position constant without the need for a duty cycle input). The null cycle determination may be performed via one of multiple methods. For example, the null duty cycle is determined via low pass filtering of the applied PWM duty cycle at 420. As another example, the null duty cycle is determined via Kalman filtering of the PWM duty cycle at 422 (herein also referred to as a recursive least squares method). Overall, the controller calculates the null duty cycle, or the duty cycle required to achieve a commanded rate of change in cam position.

Determining the null duty cycle via low pass filtering of the PWM duty cycle at 420 includes applying a step cam position reference command to the cam wheel so that the cam wheel is commanded to a position different than the hard-stop position or the mid-lock position (such as in the 10-30 degrees advance position. The cam position and/or cam speed can be monitored during the move, such as via a cam position sensor coupled to the cam, and when the cam position and/or cam speed reaches a threshold value, the low-pass filter acting on the PWM duty cycle may be activated. Alternatively, a timer may be used to activate the low-pass filter. If a timer is started, however, a timer threshold may be selected conservatively to ensure that the cam wheel is in a stationary position when the filter is activated. The low-pass filter may be, as non-limiting examples, an averaging filter, a moving average (FIR) filter, or an IIR filter. The low-pass filter may filter out the high frequency components of the signal, and may have unity DC gain. Other types of filters may also be used. After a pre-determined amount of filtering time has elapsed, which may depend on the type and time constant of the selected filter, (e.g., the filtering time could be as low as 100 ms if IIR filter is used, or could be 1 sec or higher if FIR filter is used), the output of the low-pass filter may be retrieved and used an input to estimate a null duty cycle value (DC_null value) which is plugged into a model, look-up table, or algorithm to infer estimated EOT (EOT_est), as elaborated below.

Determining the null duty cycle via Kalman filtering at 422 includes applying recursive least square (RLS) estimation to fit the PWM duty cycle and cam speed measurements with a look-up table operator and estimating the DC_null value via the look-up table. An RLS estimator may be used to obtain a 1-dimensional look-up table that maps cam speed to PWM duty cycle. The look-up table may have at least 2 input breakpoints, and the input domain may cover zero cam speed. As a non-limiting example, the input breakpoints may be selected as [−23 0 10.5] in [deg/s], so that the input domain covers zero cam speed. In this case, the look-up table entries can be estimated by the RLS estimator with a similar step cam position command as in the low-pass filtering method (of 420), and the entry corresponding to the zero cam speed can provide an accurate estimate of the DC_null value, which can be used to infer EOT_est.

At 424, the method includes estimating EOT using a mapping between the determined null duty cycle and EOT. Therein the calculated null duty cycle is passed through a mapping function, which could be a look-up table based mapping, or another functional relationship, to estimate the EOT. The mapping between the null duty cycle and the EOT can be pre-calibrated, as described below. The mapping may be a pre-calibrated mapping that uses the estimated null duty cycle as an input and generates the estimated EOT as an output. In one example, the mapped relationship between the camshaft duty cycle, the camshaft angular velocity and the engine oil temperature in the full operating range of the engine is available, in the form of a look-up table, or another mathematical relationship, from a pre-calibration procedure carried out in a test vehicle or a test bed environment where accurate engine oil temperature measurements are available.

As discussed earlier, the two independent variables controlling the angular velocity of the cam wheel are the PWM voltage applied to the solenoid of the spool valve (the OCV), and the solenoid resistance. However, since the battery voltage is known, and the solenoid resistance is majorly driven by EOT, we can treat the duty cycle of PWM (DC) and EOT as the independent variables, and form a mapping relationship to characterize the actuator as per equation (1) as:

$$\text{CAM SPEED}=F(\text{EOT},\text{DC}). \quad (1)$$

An inverse model with respect to EOT is characterized next since the angular velocity of the cam wheel is measurable via a cam position sensor, and the PWM DC applied to the solenoid is known. The inverted model can be used to calculate the EOT using the applied PWM DC and the measured angular cam speed as per equation (2) below:

$$\text{EOT}_{est}=F^{-1}(\text{CAM SPEED},\text{DC}) \quad (2)$$

where $\text{EOT}_{est}$ is the estimated EOT, and $F^{-1}$ is the inverse model applied with respect to EOT.

In one example, in order to simplify the calculation and make it more practical for implementation, EOT estimation can be carried out at a predefined cam speed. For example, when cam speed is equal to zero, the estimation can be reduced to equation (3) as follows:

$$\text{EOT}_{est}=F_{null}^{-1}(\text{DC}_{null}), \quad (3)$$

where $F_{null}^{-1}(X)=F^{-1}(0,X)$, and $\text{DC}_{null}$ is the null duty cycle (that is, the duty cycle that produces zero cam wheel angular velocity). It will be appreciated that while the method of FIG. 4 maps EOT based on a mapped relationship to a null duty cycle and null cam speed, in alternate examples, the mapping may be similarly adapted (by adapting the relevant equations (1)-(3)) for any cam speed value that is within the bandwidth of the cam position sensor. In other words, equation (3) can be generalized to include cam speeds other than null within the bandwidth of the cam position sensor.

Figure 5:
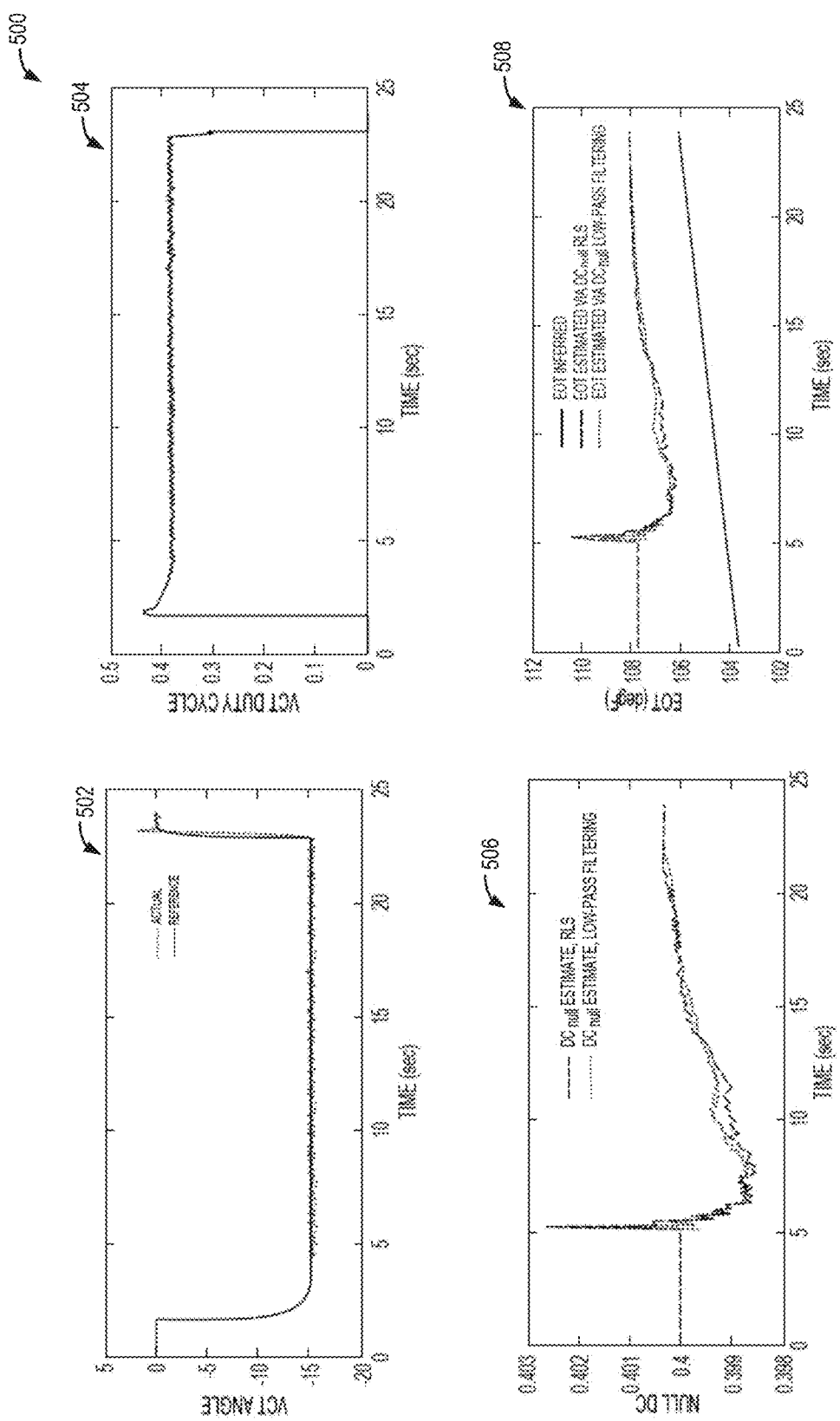
FIG. 5 depicts an example null duty cycle determination for the OCV.

FIG. 5 demonstrates null cycle determination at map 500. In particular, plots 502-508 of map 500 depict null cycle determination via both the low-pass filtering and Kalman methods discussed at FIG. 4 (at 422 and 424) to obtain DC_null value on a 2014 Ford KA test vehicle with a 1.5 L PFI Sigma engine running at an engine speed of 1500 rpm. A duty cycle applied to an intake cam during an excitation pulse is shown at plot 502. A corresponding change in the cam angle is shown at plot 504. Null duty cycle estimation based on the applied duty cycle and the measured change in cam angle is shown at plot 506. An EOT that is inferred based on the estimated null duty cycle via a defined mapping is shown at plot 508.

In the example of map 500, with reference to plots 502-508, a −10 deg step reference command is applied to the intake cam wheel at around t=17 s and both low-pass-filtering and RLS algorithms are turned on near t=25 s. A simple averaging filter is used for the low-pass-filtering algorithm. For the RLS algorithm, a forgetting factor of 0.995 is used with an initial covariance matrix of 10*I, where I is the 3×3 identity matrix. 5 seconds after applying the step reference command, both algorithms are enabled, and DC_null value estimates from each algorithm are retrieved. In the depicted example, the DC_null value estimated via both the low-pass filtering and the Kalman filtering approaches converge to 0.363. The mapped EOT estimate is about 91 deg F.

Focusing on the null duty cycle approach without loss of generality, it follows from equation (3) that using the inverse model ($F_{null}^{-1}$), and the real-time knowledge of the null duty cycle $\text{DC}_{null}$, the controller may calculate $\text{EOT}_{est}$ at any time during engine operation.

The controller may model the mapped inverse function ($F_{null}^{-1}$) via various approaches. Irrespective of the approach applied, $F_{null}^{-1}$ may be modeled as a look-up table stored in the controller's memory (such as in the KAM) for simplicity of implementation into the embedded hardware.

The various methods used for mapping the inverse function includes a first method that relies on existing calibration maps in the controller's memory. For example, a first mapped relationship "fnvct_rate2dc_base" may be an existing calibration map in the controller's memory that maps the EOT and the cam angular velocity (or "rate") into a PWM duty cycle, where cam rate is the same as cam speed. This map may have been used to determine a cam response time and infer if a cam is functional or degraded during a diagnostic routine. In addition, the map is also used as a characterization table to be used by the feedforward VCT controller to calculate a feedforward duty cycle. Therein, the map is used by the VCT control feature to calculate a feedforward VCT duty cycle in response to a reference cam position command. The input to this table is the requested VCT shifting rate (or cam speed), which is calculated based on the difference between the actual cam position and the reference cam position, and the EOT; the output is the feedforward duty cycle to be applied to the solenoid.

This map could also be used for obtaining $F_{null}^{-1}$. Assuming that fnvct_rate2dc_base is calibrated accurately, and represents the actual actuator response, the entries of this map can be used to construct a model $F_{null}^{-1}$ that accurately represents the EOT relationship depicted at equation (3).

Turning briefly to FIG. 6, a non-limiting example of constructing a model of $F_{null}^{-1}$ using an existing map is shown. Consider a smaller scale "fnvct_rate2dc_base" lookup table 600 depicted at FIG. 6, which is assumed to have been calibrated for optimizing the VCT control feature. The DC entries in the column associated with 0 cam rate (highlighted by dashed block 602) can be used to construct a $F_{null}^{-1}$ lookup table as shown at table 620, which can be used for EOT estimation within the range [120, 180] deg F. As one example, during vehicle operation, if $DC_{null}$ is estimated to be 0.41, then the estimated EOT is inferred to be 126 deg F. according to table 620, by interpolating between the neighboring table entries as dictated by the well-known look-up table algebra.

One advantage of using an existing map to model the inverse function is that it may be computationally less intensive and therefore easier to implement. Since this approach makes use of the calibration effort that has already taken place for the construction of the reference map (herein "fnvct_rate2dc_base"), the approach requires almost no calibration effort. However, it relies on the assumption that the calibration of fnvct_rate2dc_base accurately represents the OCV, and even further, it relies on the more restrictive assumption that fnvct_rate2dc_base exists in the powertrain strategy in the first place. There may be conditions or situations where the reference map is not available, not accessible, or not reliable.

An alternative data-driven approach for constructing a lookup table model of $F_{null}^{-1}$ without using fnvct_rate2dc_base from the VCT feature is discussed now. The data-driven approach may be applied during a calibration phase of a vehicle (when other vehicle software is being calibrated). Additionally or optionally, the alternative approach may be extended to construct the look-up table adaptively (e.g., in real-time) during vehicle operation to correct for initial calibration errors and change-over-time variations. The only required assumption for the data driven approach is that during the acquisition of the data which will be used for construction of $F_{null}^{-1}$, the EOT is measured or inferred accurately. That is, it may be first confirmed that none of the failure modes (such as the EOT faults detected at 410) that corrupt the EOT measurements apply during the calibration of $F_{null}^{-1}$. For example, it may be confirmed that none of an ECT sensor fault, an ACT sensor fault, and a KAM controller fault can corrupt the EOT measurements during the calibration. If this assumption holds, then the construction of $F_{null}^{-1}$ may be performed by choosing one or more $DC_{null}$ breakpoints for the look-up table. The one or more $DC_{null}$ breakpoints as well as the look-up table entries corresponding to these breakpoints may be selected based on an optimization routine that provides the best look-up table fit to the collected data points, where the data points include measured EOT quantities provided by the aforementioned EOT measurement/inference methods, and $DC_{null}$ values, which may be determined by using the low-pass filtering method or the RLS method as described earlier.

Figure 10:
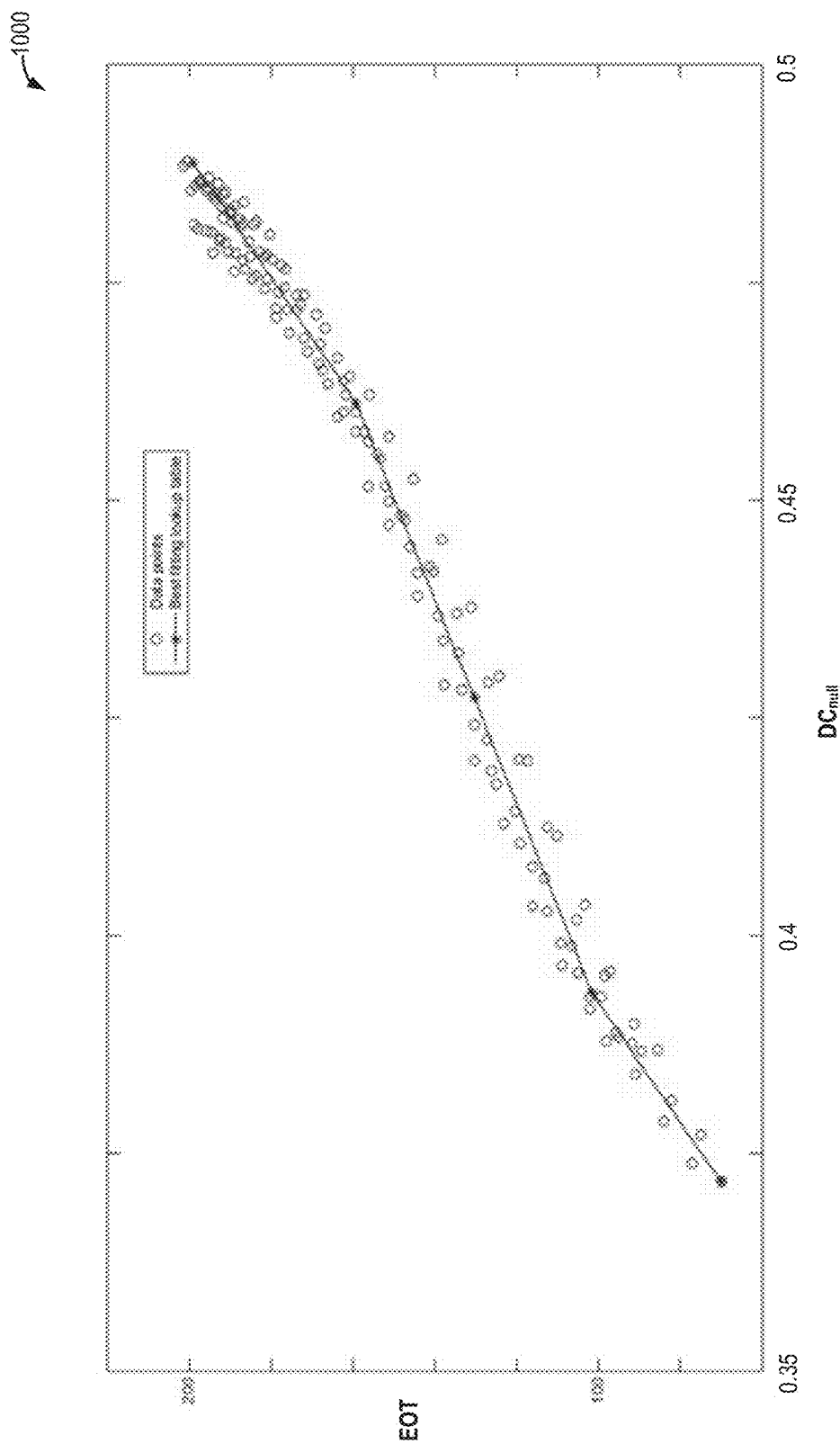

An example of selecting the one or more breakpoints is shown with reference to map 1000 of FIG. 10.

As one example, if 0.363 is chosen as a $DC_{null}$ breakpoint for $F_{null}^{-1}$, then the profile depicted in FIG. 5 can be used to populate the lookup table entry of $F_{null}^{-1}$ corresponding to 0.363, which would have resulted in this entry to be chosen as 91 degrees Celsius as both low-pass-filtering and RLS methods suggests. Similar profiles could be applied at different EOTs to populate an $F_{null}^{-1}$ lookup table that covers a large range of EOTs, which can later be used in equation (3) for EOT estimation. It will be appreciated that the input to the table is a null duty cycle (such as the null duty cycle breakpoints), and the output is an estimated EOT.

With reference to FIG. 6, a lookup table model for $F_{null}^{-1}$ obtained by applying EOT breakpoints is shown at table 630. The breakpoints were chosen as [100 120 140 160 175 185 190 195] deg F. The vehicle was let to idle at 1500 rpm crank speed for about 30 minutes, and the step commanded excitation profile similar to the one depicted in FIG. 5 was applied near the breakpoint temperatures to obtain the corresponding DC_null entries.

Returning to FIG. 4, at 426, the controller may adjust one or more engine torque actuators based on the estimated EOT. For example, the controller may compare the estimated EOT to upper and lower thresholds, and based on the comparison, the controller may select an engine torque actuator, as well as an amount and direction of adjustment of the selected torque actuator. As an example, responsive to the estimated EOT being higher than an upper threshold, an engine output may be limited, boost pressure may be limited, and/or an engine torque provided responsive to an operator torque demand may be limited. As another example, an engine idling speed may be limited to reduce engine overheating. As yet another example, upper and lower engine speed thresholds of a permissible engine speed range may be limited (e.g., by reducing the upper engine speed threshold and/or raising the lower engine speed threshold) if the EOT is too low or too high in order to protect the engine from extreme temperature conditions.

Next, at 428, it may be determined if a one-time estimation of EOT is required, or if continuous EOT monitoring is required. This may be based on the EOT fault that triggered the alternate EOT estimation, as well as the engine parameter that is controlled based on the EOT estimation. As one example, a one-time estimation of EOT may be required to provide robustness for potential loss of signals due to a KAM error (e.g., KAM corruption), or low reliability of a functional ECT sensor during warm-start conditions. In this case, the controller may execute the method of FIG. 4 only once, right after a warm start of the engine, where there may be a significant temperature difference between the ECT temperature and the EOT temperature. As another example, a continuous estimation of EOT may be required to provide robustness for a potential loss of sensor signal during vehicle operation due to a permanent sensor error, such as due to ACT sensor or ACT sensor degradation, or KAM degradation. In this case, the controller may execute the method continuously or reiteratively as long as the corresponding sensor error (or EOT fault flag) is set.

If a one-time estimation is required, then at 430, the controller may update the EOT estimate and then the routine ends. Another iteration of the routine may only be triggered if EOT estimation is required and EOT faults are determined, as discussed earlier at 404 and 410.

If continuous estimation is required, the controller may execute the routine continuously and keep updating the EOT estimate after each iteration of the routine.

Since the excitation profile applied to the intake or exhaust cam can interfere with VCT operation, even if for a short period of time, at 432, while in the continuous mode, the controller may pause the routine and start a timer. By starting the timer, the routine can be paused only for a pre-determined time period. The length of this pause can be defined by a pre-determined time threshold. At 434, it may be determined if the pre-determined time threshold since the timer was started. If not, the controller nay wait for the pre-determined time threshold to elapse. Else, if the pre-determined time threshold has elapsed on the timer, the routine returns to 408 and starts monitoring the relevant fault flags indicative of EOT faults. The routine then reiterates.

In this way, a more reliable EOT estimate may be provided, particularly when selected error codes are set. Specifically, since the EOT estimate determined based the mapped relationship between solenoid duty cycle and cam movement does not rely on sensors such as the ECT sensor, the MAF sensor, the ACT sensor, or any variable stored in the KAM, the method may be more robust to sensor error, KAM corruption, and unreliability during warm engine start conditions.

It will be appreciated that while the method of FIG. 4 depicts EOT being estimated via the mapped relationship between VCT solenoid valve duty cycle, VCT angular velocity, and engine oil temperature responsive to a fault flag (indicating a fault at an EOT sensor, a MAF sensor, an ECT sensor, an ACT sensor, and/or a KAM), this is not meant to be limiting. In further examples, EOT may be estimated via the mapped relationship responsive to a fault in any engine component that is generally used in EOT estimation. Furthermore, EOT estimation via the mapped relationship may be used as a primary or default method for EOT estimation, reducing the reliance on sensors (e.g., reducing the need for an EOT sensor). In still other examples, EOT estimation via the mapped relationship may be used to confirm the sensor-based EOT estimation, or vice versa, where the mapped relationship is the default method of EOT estimation, the sensor-based EOT estimation may be used to confirm the mapping-based approach. In yet further examples, both the sensor-based EOT estimation and the mapping-based estimation may be used, a weightage of each approach varied based on engine operating conditions. For example, the weightage of the sensor-based approach may be increased during a cold engine start while the weightage of the mapping-based approach may be increased during a warm engine start.

Figure 7:
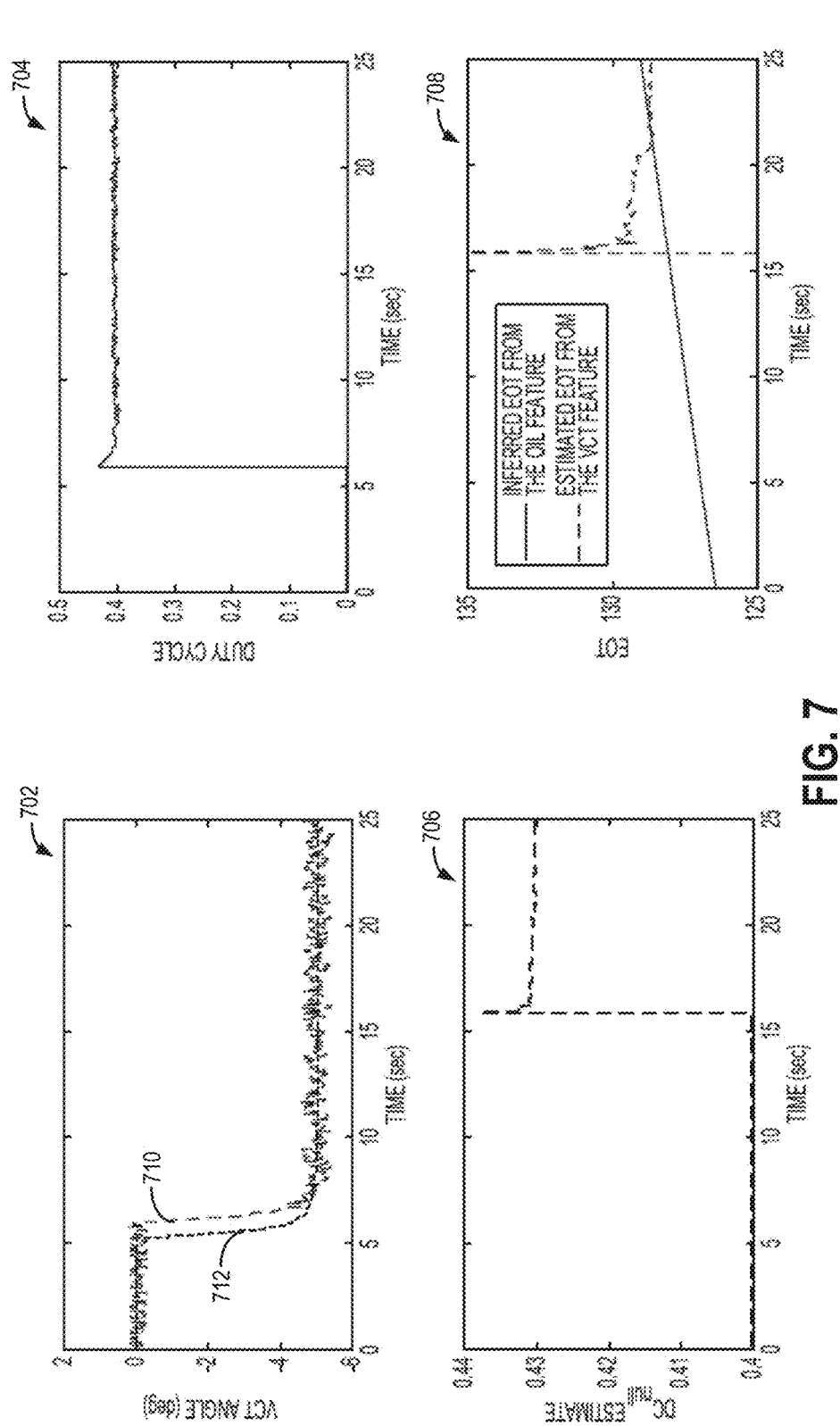
FIGS. 7-10 depict example EOT estimation results.

FIG. 7 demonstrates EOT estimation during a cold engine start at map 700. In particular, plots 702-708 of map 700 depict null cycle determination via Kalman filtering to obtain DC_null values on a test vehicle with a 1.5 L PFI engine. A duty cycle applied to an intake cam during an excitation pulse is shown at plot 702 (actual duty cycle applied depicted at line 710 versus reference command depicted at line 712). A corresponding change in the cam angle is shown at plot 704. Null duty cycle estimation based on the applied duty cycle and the measured change in cam angle is shown at plot 706. An EOT that is inferred based on the estimated null duty cycle via a defined mapping is shown at plot 708.

In the example of map 700, a vehicle is cold-started and let run on idle speed for about 10 minutes until the EOT reached about 125 deg F. Then, data was recorded while a −10 deg step reference command was applied to the intake cam wheel as shown with reference to plot 702. After about 10 seconds following the step reference command, the RLS null duty cycle estimation algorithm was turned on, and EOT estimates were subsequently determined by applying equation (3). For the RLS algorithm, a forgetting factor of 0.995 is used with an initial covariance matrix of 10*I, where I is the 3×3 identity matrix. 5 seconds after applying the algorithms are applied, DC_null value estimates are retrieved. An $F_{null}^{-1}$ lookup table described earlier at 630 of FIG. 6 is also generated. With reference to plot 708, the estimated EOT at the warm start (solid line/red line), as determined via the above-discussed sensor-less, filtering and data-driven approach, converges to the inferred EOT (dashed line/blue line) determined via the EOT inference logic which uses the KAM variables for initialization, and the onboard ACT and ECT sensors after initialization.

Figure 8:
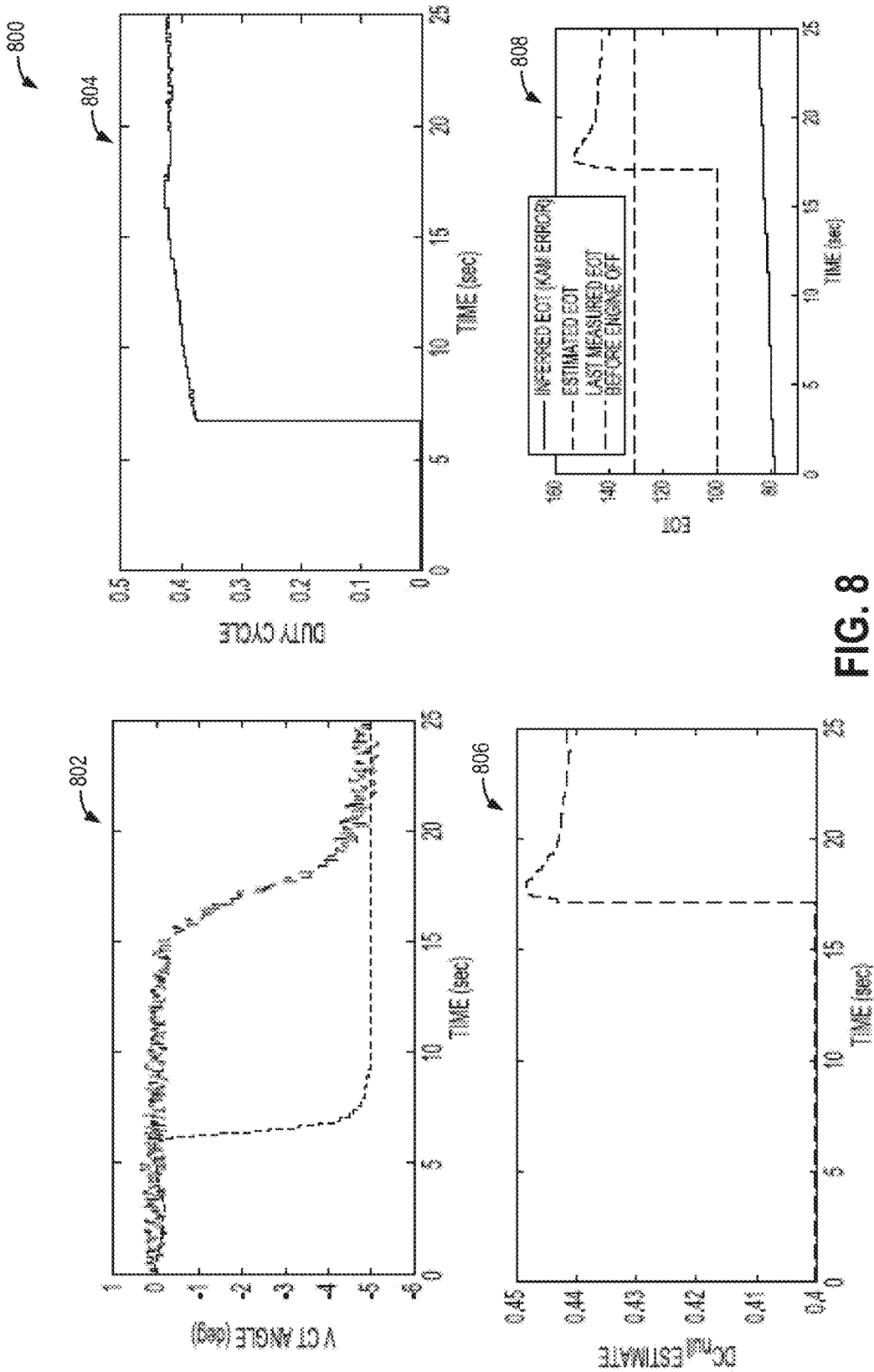

FIG. 8 demonstrates EOT estimation during a warm engine start at map 800. In particular, plots 802-808 of map 800 depict null cycle determination via Kalman filtering to obtain DC_null value on a test vehicle with a 1.5 L PFI engine. A duty cycle applied to an intake cam during an excitation pulse is shown at plot 802. A corresponding change in the cam angle is shown at plot 804. Null duty cycle estimation based on the applied duty cycle and the measured change in cam angle is shown at plot 806. An EOT that is estimated based on the estimated null duty cycle via a defined mapping is shown at plot 808.

Following the mapping shown at FIG. 7, the engine was turned off for about 5 minutes before being restarted. During the restart, a KAM error is determined to have happened, which triggers an EOT fault code that causes the inferred EOT calculation logic to start with a wrong initial condition. This causes the inferred EOT value to be about 77 deg F. at the time of vehicle restart. This value is not accurate, as the engine oil temperature could not have cooled down by more than 50 deg F. within 5 minutes (the temperature outside the vehicle was about 65 deg F.). Furthermore, since the engine coolant temperature was measured to be 196 deg F. when the engine was turned off, and it was measured to be 188 deg F. when the engine was restarted, it is expected that the EOT should actually increase during the initial minutes of the engine off time period. With reference to plots 802-808, about 10 seconds after vehicle restart, a 10 deg step reference command is applied to the VCT intake cam wheel, and the EOT estimation algorithm is turned on shortly thereafter. The estimated EOT converges near 143 deg in about 5 seconds, which is a plausible value, as about 10 deg oil temperature increase is expected over 5 minutes in an environment where engine coolant temperature is around 190 deg F. This example provides a validation for the described inference based approach, and demonstrates a potential use for the algorithm to replace the initial value of the inferred EOT logic with the estimate determined based on the EOT mapping during a warm restart by running a quick estimation profile in the first few seconds of idling time after engine start-up. With reference to plot 808, the solid lined (blue) curve is the inferred EOT, which is the existing EOT signal generated by the ACT and ECT sensors.

In particular, the engine is restarted after about 5 minutes of engine soak time, and during restart, an error in the Keep-Alive-Memory (KAM) causes the controller to start the EOT inference logic from the wrong initial condition. For this reason, the inferred EOT value is around 80 deg F. throughout the run. Since the last inferred EOT before engine turn off was 130 deg F., and the engine coolant temperature is around 190 deg F., the EOT is actually expected to increase during a short engine soak time. The current EOT estimation algorithm results in 143 deg F. estimated EOT after engine turn on, which is in line with expectations.

Figure 9:
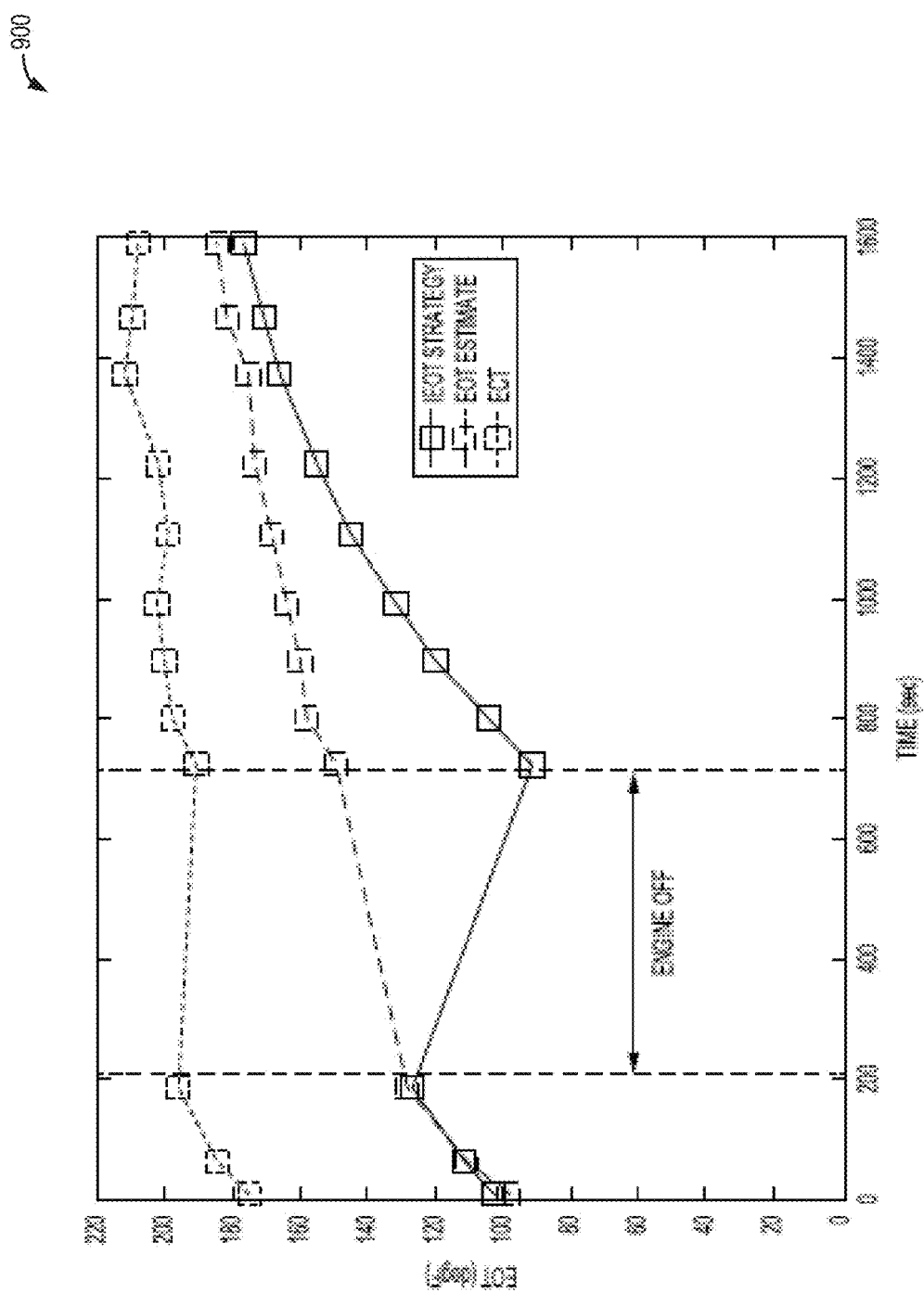

Continuing this experiment, the invented EOT estimation algorithm and the legacy/existing EOT inference algorithm are compared at map 900 of FIG. 9. In particular, recorded EOT data is shown at plots 902-906. Data was collected at the time instants corresponding to the square signs. The lines in between the squares are generated by linear interpolation and do not correspond to an actual data reading. The engine was allowed to idle for a few minutes until the inferred EOT reached 100 deg F. (which corresponds to t=0). Then, EOT estimates were collected using the mapping based approach discussed herein at discrete points in time until about t=200 seconds. Then, the engine was turned off and allowed to cool down for about 510 seconds, before being restarted. After the restart, collecting of estimated and inferred EOT values, as well as the measured ECT value, was resumed. During the engine restart, the same/aforementioned KAM error caused the legacy/existing inferred EOT algorithm to start from a faulty initial value of about 80 deg F. As used herein, the inferred EOT refers to the existing original EOT algorithm that represents the legacy EOT algorithm running in the test vehicle. It is called inferred because it uses ACT/ECT sensors (and not an EOT sensor) to calculate an EOT value. On the other hand, estimated EOT refers to EOT estimated via the mapping of the present disclosure. It is observed that the inferred EOT and estimated EOT are almost equal until the engine is turned off. After restart, the difference between the estimated EOT and the inferred EOT is large due to the KAM error. The existing EOT inference algorithm is faulty due to the KAM error, whereas the EOT estimates provided by the mapping of the present disclosure remain plausible based on the engine off time (or soak time), the EOT value before engine off, and the ECT value before and after engine off, demonstrating the accuracy of the mapping. In particular, since the EOT estimation via the mapping does not require KAM parameters and ECT/ACT sensors, the estimation is immune to any type of failure mode occurrence in these components, which is validated for a particular KAM failure mode in FIG. 9. Also, since the effects of initialization error on the existing EOT inference logic diminish over time, the inferred EOT algorithm becomes more accurate as time is increased, and the mapped EOT estimation algorithm and the legacy EOT inference algorithm appear to converge near each other over time, as shown in FIG. 9.

In this way, during an engine cold-start condition, an engine controller may estimate an engine oil temperature based on each of measured engine coolant temperature, measured ambient temperature, and measured air charge temperature (or directly measure engine oil temperature via a dedicated sensor). In comparison, during an engine warm-start condition, the controller may estimate the engine oil temperature based on a mapped relationship between solenoid duty cycle of a spool valve of a variable cam timing device, angular velocity of a cam actuated by the spool valve, and the engine oil temperature. For example, during the engine warm-start condition, the engine oil temperature may be estimated based on the mapped relationship for a first duration since a first combustion event of the engine warm-start, and after the first duration, the engine oil temperature may be transitioned to being estimated based on each of the measured engine coolant temperature, the measured ambient temperature, and the measured air charge temperature. For the first duration, the engine oil temperature may be estimated independent of the measured engine coolant temperature, the measured ambient temperature and the measured air charge temperature. Further, during the warm-start condition, the controller may adjust the solenoid duty cycle applied to the spool valve to move the cam from a current position to a final position outside of a hard-lock position, and measure the angular velocity via a position sensor coupled to the cam following application of the solenoid duty cycle. As an example, the mapping during the warm-start may include estimating a null duty cycle of the spool valve based on the adjusted solenoid duty cycle and the measured angular velocity; and estimating the engine oil temperature by passing the estimated null duty cycle value through a mapped relationship between the null duty cycle and the engine oil temperature. In this way, an accuracy of EOT estimation can be improved with reduced reliance on existing sensors. The technical effect of leveraging the engine oil temperature dependency of solenoid resistance for a VCT spool valve (or OCV), a defined mapping between the PWM duty cycle (DC) applied to the solenoid of the spool valve and the angular velocity of the cam wheel can be learned. By characterizing the mapping by applying a known PWM duty cycle signal and measuring the resulting cam wheel angular velocity, EOT may be inferred without the need for dedicated sensors. By relying on the mapped relationship, EOT estimation can be performed even when default EOT estimation sensors (such as an ECT sensor, ACT sensor, or EOT sensor) are degraded, as well as during conditions when the output of the sensors is not reliable, such as during warm engine starts and when a controller memory is corrupt. By improving EOT estimation, engine torque control is improved.

One example engine method comprises: adjusting an engine torque actuator based on engine oil temperature estimated by applying an excitation signal, including one of a pulse-width modulated duty cycle, a voltage, and an electrical current, to a solenoid valve of a variable camshaft timing device, and using a mapped relationship, stored in non-volatile memory, relating camshaft solenoid duty cycle and camshaft angular velocity of the device to engine oil temperature. In the preceding example, additionally or optionally, the adjusting is responsive to one of degradation of a sensor used to directly or indirectly measure the engine oil temperature, and corruption of the non-volatile memory, the non-volatile memory including a keep-alive memory of an engine controller, the sensor including one or more of an engine oil temperature sensor coupled to an oil sump, an engine coolant temperature sensor, an air-charge temperature sensor, and a mass air flow sensor. In any or all of the preceding examples, additionally or optionally, the adjusting is responsive to an engine warm start condition. In any or all of the preceding examples, additionally or optionally, the applied pulse-width modulated duty cycle moves the one of the intake and exhaust cam outside of a hard-stop position. In any or all of the preceding examples, additionally or optionally, estimating engine oil temperature further includes: estimating a null duty cycle of the solenoid of the spool valve via low-pass or Kalman filtering of the applied duty cycle, where the null duty cycle includes a duty cycle quantity that results in zero angular velocity for the VCT device outside of a hard-stop or a pin-lock position; and estimating the engine oil temperature via a pre-calibrated mapping that uses the estimated null duty cycle as input, and generates the estimated engine oil temperature as output. In any or all of the preceding examples, additionally or optionally, applying an excitation signal includes applying an incrementally increasing duty cycle, voltage, or electrical current to the solenoid and measuring the camshaft angular velocity following each incremental increase. In any or all of the preceding examples, additionally or optionally, applying the excitation signal includes applying, via a closed-loop controller, a reference angular position command to vary angular velocity of a camshaft of the device, and measuring the camshaft angular velocity and one of the duty cycle, voltage, and the electrical current applied to the solenoid by the closed-loop controller. In any or all of the preceding examples, additionally or optionally, adjusting the engine torque actuator based on the estimated engine oil temperature includes limiting one or more of an engine torque, an engine speed, and a boost pressure output of the engine responsive to the inferred engine oil temperature being higher than a threshold temperature. In any or all of the preceding examples, additionally or optionally, the variable camshaft timing device uses a solenoid oil control actuator.

Another example method comprises: during an engine cold-start condition, estimating an engine oil temperature based on each of measured engine coolant temperature, measured ambient temperature, and measured air charge temperature; and during an engine warm-start condition, estimating the engine oil temperature based on a mapped relationship between solenoid duty cycle of a spool valve of a variable cam timing device, angular velocity of a cam actuated by the spool valve, and the engine oil temperature. In the preceding example, additionally or optionally, during the engine warm-start condition, the engine oil temperature is estimated based on the mapped relationship for a first duration since a first combustion event of the engine warm-start, and after the first duration, the engine oil temperature is estimated based on each of the measured engine coolant temperature, the measured ambient temperature, and the measured air charge temperature. In any or all of the preceding examples, additionally or optionally, for the first duration, the engine oil temperature is estimated independent of the measured engine coolant temperature, the measured ambient temperature and the measured air charge temperature. In any or all of the preceding examples, additionally or optionally, the method further comprising, during the warm-start condition: adjusting the solenoid duty cycle applied to the spool valve to move the cam from a current position to a final position outside of a hard-lock position; and measuring the angular velocity via a position sensor coupled to the cam following application of the solenoid duty cycle. In any or all of the preceding examples, additionally or optionally, the mapping during the warm-start includes: estimating a null duty cycle of the spool valve based on the adjusted solenoid duty cycle and the measured angular velocity; and estimating the engine oil temperature by passing the estimated null duty cycle value through a mapped relationship between the null duty cycle and the engine oil temperature.

An example engine system may comprise a variable cam timing (VCT) device including a cam, a camshaft phaser, a camshaft, a spool valve, and a solenoid; a cam position sensor coupled to the cam; a battery; an engine coolant temperature sensor; an intake air charge temperature sensor; a mass air flow sensor; and a controller. The controller may include computer-readable instructions stored on non-transitory memory for: responsive to at least one diagnostic flag related to engine oil temperature estimation being set, applying an excitation pulse to the solenoid to move the spool valve, a duty cycle of the excitation pulse adjusted to move the cam outside of a hard-stop region; measuring an angular velocity of the camshaft following the applying via the cam position sensor; estimating a null duty cycle of the spool valve based on the applied duty cycle; and estimating an engine oil temperature based on a mapped relationship between the estimated null duty cycle and the measured angular velocity. In the preceding example, additionally or optionally, the controller may include further instructions for: limiting each of an upper and a lower engine speed threshold based on the estimated engine oil temperature, the upper engine speed threshold lowered and the lower engine speed threshold raised as the estimated engine oil temperature exceeds a threshold temperature. In any or all of the preceding examples, additionally or optionally, the at least one diagnostic flag related to engine oil temperature estimation is set responsive to one of degradation of the engine coolant temperature sensor, degradation of the intake air charge temperature sensor, degradation of the mass air flow sensor, corruption of the memory, and an engine warm-start condition. In any or all of the preceding examples, additionally or optionally, the mapped relationship is stored in the memory and uses a last estimated engine oil temperature, the estimated null duty cycle, and the measured angular velocity as inputs. In any or all of the preceding examples, additionally or optionally, the cam is one of an intake cam and an exhaust cam, the memory is a keep-alive memory, and the null duty cycle includes a duty cycle quantity that results in zero angular velocity for the VCT device outside of a hard-stop or a pin-lock position. In any or all of the preceding examples, additionally or optionally, the controller includes further instructions for, responsive to no diagnostic flag related to engine oil temperature estimation being set, estimating the engine oil temperature based on an output of one or more of the engine coolant temperature sensor, the intake air charge temperature sensor, and the mass air flow sensor.

In a further representation, a method for an engine comprises: applying an excitation signal to a solenoid valve of a variable camshaft timing (VCT) device; estimating an engine oil temperature from a mapped relationship, stored in non-volatile memory, relating camshaft solenoid duty cycle and camshaft angular velocity of the VCT device to the engine oil temperature; and adjusting an engine torque actuator based on the estimated engine oil temperature. In the preceding example, additionally or optionally, the VCT device is oil-pressure actuated. In still another further representation, the engine is coupled in a hybrid electric vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
adjusting an engine torque actuator based on engine oil temperature estimated by applying an excitation signal, including one of a pulse-width modulated duty cycle, a voltage, and an electrical current to a solenoid valve of a variable camshaft timing (VCT) device, and using a mapped relationship, stored in non-volatile memory, relating camshaft solenoid duty cycle and camshaft angular velocity of the device to the engine oil temperature, wherein the adjusting is responsive to one of degradation of a sensor used to directly or indirectly measure the engine oil temperature, and corruption of the non-volatile memory, the non-volatile memory including a keep-alive memory of an engine controller, the sensor including one or more of an engine oil temperature sensor coupled to an oil sump, an engine coolant temperature sensor, an air-charge temperature sensor, and a mass air flow sensor.

2. The method of claim 1, wherein the adjusting is responsive to an engine warm start condition.

3. The method of claim 1, wherein the applied duty cycle moves the one of an intake and exhaust cam outside of a hard-stop position.

4. The method of claim 1, wherein estimating the engine oil temperature further includes:
estimating a null duty cycle of the solenoid valve via low-pass or Kalman filtering of the applied duty cycle, where the null duty cycle includes a duty cycle quantity that results in zero angular velocity for the VCT device outside of a hard-stop or a pin-lock position; and
estimating the engine oil temperature via a pre-calibrated mapping that uses the estimated null duty cycle as input, and generates the estimated engine oil temperature as output.

5. The method of claim 1, wherein applying the excitation signal includes:
applying an incrementally increasing duty cycle, voltage, or electrical current to the solenoid valve and measuring the camshaft angular velocity following each incremental increase.

6. The method of claim 1, wherein applying the excitation signal includes:
applying, via a closed-loop controller, a reference angular position command to vary angular velocity of a camshaft, and measuring the camshaft angular velocity and one of the duty cycle, voltage, and the electrical current applied to the solenoid valve by the closed-loop controller.

7. The method of claim 1, wherein adjusting the engine torque actuator based on the estimated engine oil temperature includes limiting one or more of an engine torque, an engine speed, and a boost pressure output of an engine responsive to the inferred engine oil temperature being higher than a threshold temperature.

8. The method of claim 1, wherein the variable camshaft timing device uses a solenoid oil control actuator.

9. A method, comprising:
during an engine cold-start condition, estimating an engine oil temperature based on each of measured engine coolant temperature, measured ambient temperature, and measured air charge temperature; and
during an engine warm-start condition, estimating the engine oil temperature based on a mapped relationship between a solenoid duty cycle of a spool valve of a variable cam timing device, angular velocity of a cam actuated by the spool valve, and the engine oil temperature.

10. The method of claim 9, wherein during the engine warm-start condition, the engine oil temperature is estimated based on the mapped relationship for a first duration since a first combustion event since the engine warm-start, and after the first duration, the engine oil temperature is estimated based on a combination of the measured engine coolant temperature, the measured ambient temperature, and/or the measured air charge temperature.

11. The method of claim 10, wherein for the first duration, the engine oil temperature is estimated independent of the measured engine coolant temperature, the measured ambient temperature, and the measured air charge temperature.

12. The method of claim 10, further comprising, during the warm-start condition:
adjusting the solenoid duty cycle applied to the spool valve to move the cam from a current position to a final position outside of a hard-lock position; and
measuring the angular velocity via a position sensor coupled to the cam following application of the solenoid duty cycle.

13. The method of claim 12, wherein the mapping during the engine warm-start includes:
estimating a null duty cycle of the spool valve based on the adjusted solenoid duty cycle and the measured angular velocity; and
estimating the engine oil temperature by passing the estimated null duty cycle through a mapped relationship between the null duty cycle and the engine oil temperature.

14. An engine system, comprising:
a variable cam timing (VCT) device including a cam, a camshaft phaser, a camshaft, a spool valve, and a solenoid;
a cam position sensor coupled to the cam;
a battery;
an engine coolant temperature sensor;
an intake air charge temperature sensor;
a mass air flow sensor; and
a controller including computer-readable instructions stored on non-transitory memory for:
responsive to at least one diagnostic flag related to engine oil temperature estimation being set,
applying an excitation pulse to the solenoid to move the spool valve, a duty cycle of the excitation pulse adjusted to move the cam outside of a hard-stop region;
measuring an angular velocity of the camshaft following the applying via the cam position sensor;
estimating a null duty cycle of the spool valve based on the applied duty cycle; and estimating an engine oil temperature based on a mapped relationship between the estimated null duty cycle and the measured angular velocity.

15. The system of claim 14, wherein the controller includes further instructions for:
limiting each of an upper and a lower engine speed threshold based on the estimated engine oil temperature, the upper engine speed threshold lowered and the lower engine speed threshold raised as the estimated engine oil temperature exceeds a threshold temperature.

16. The system of claim 15, wherein the at least one diagnostic flag related to engine oil temperature estimation is set responsive to one of degradation of the engine coolant temperature sensor, degradation of the intake air charge temperature sensor, degradation of the mass air flow sensor, corruption of the memory, and an engine warm-start condition.

17. The system of claim 15, wherein the mapped relationship is stored in the memory and uses a last estimated engine oil temperature, the estimated null duty cycle, and the measured angular velocity as inputs.

18. The system of claim 15, wherein the cam is one of an intake cam and an exhaust cam, the memory is a keep-alive memory, and the null duty cycle includes a duty cycle quantity that results in zero angular velocity for the VCT device outside of a hard-stop or a pin-lock position.

19. The system of claim 15, wherein the controller includes further instructions for:
responsive to no diagnostic flag related to engine oil temperature estimation being set, estimating the engine oil temperature based on an output of one or more of the engine coolant temperature sensor, the intake air charge temperature sensor, and the mass air flow sensor.

* * * * *